United States Patent [19]
Allen

[11] Patent Number: 5,328,038
[45] Date of Patent: Jul. 12, 1994

[54] STORAGE RACK SYSTEMS

[75] Inventor: Donald R. Allen, Frenchtown, N.J.

[73] Assignee: Frazier Industrial Company, Long Valley, N.J.

[21] Appl. No.: 15,792

[22] Filed: Feb. 10, 1993

[51] Int. Cl.[5] ............................................. A47F 5/00
[52] U.S. Cl. ................................... 211/151; 414/276
[58] Field of Search ............... 211/151, 59.2; 414/276, 414/286

[56] References Cited

U.S. PATENT DOCUMENTS

| 4,197,047 | 4/1980 | Haldimann | 414/276 |
|---|---|---|---|
| 4,613,270 | 9/1986 | Konstant et al. | 211/151 X |
| 4,773,546 | 9/1988 | Konstant | 211/151 |
| 4,949,852 | 8/1990 | Allen | 211/151 |
| 4,982,851 | 1/1991 | Konstant | 211/151 |
| 5,080,241 | 1/1992 | Konstant | 211/151 |
| 5,117,990 | 6/1992 | Krummell et al. | 211/151 |
| 5,137,159 | 8/1992 | Collins et al. | 211/151 |
| 5,141,118 | 8/1992 | Gay | 211/151 |
| 5,184,738 | 2/1993 | Allen | 211/151 |
| 5,203,464 | 4/1993 | Allen | 211/151 |

Primary Examiner—Robert W. Gibson, Jr.
Attorney, Agent, or Firm—Joseph W. Molasky & Associates

[57] ABSTRACT

A storage rack system having a plurality of storage bays adapted to store pallet loads that are seven pallets deep is disclosed. One storage rack system disclosed includes six carts each adapted to support a single pallet load and being supported on track means for movement from a forward position to a back position. Another storage rack system disclosed includes a first cart for supporting a single pallet load, and two double carts each adapted to support two pallet loads, the carts being supported on track means for movement from a forward position to a back position.

17 Claims, 18 Drawing Sheets

STORAGE RACK SYSTEMS

BACKGROUND OF THE INVENTION

1. Field of the Invention

This invention relates generally to storage rack systems for articles loaded on pallets of the type adapted to be handled by lift trucks and, more particularly, to storage rack systems of the push-back type.

2. Description of the Prior Art

Push-back storage systems are known in the art with a two deep system being in use since the late 1950's, this system being manufactured by Frazier Industrial Company. More recently, three-deep and four-deep systems are known in the art. In U.S. Pat. No. 4,955,489, there is disclosed a storage rack system of the push-back type, and reference is made to the prior art cited in said patent. In U.S. Pat. No. 4,949,852. there is disclosed three-deep and four-deep systems having a double cart assembly wherein a large cart rides on the tracks and a small cart is carried by and movably mounted on the large cart. In my pending application, Ser. No. 709,664, filed Jun. 7, 1991, there is disclosed storage rack systems adapted to store pallet loads that are three, four, and five pallets deep.

Typical of the prior art are the storage rack systems shown in U.S. Pat. Nos. 4,341,313 and 4,773,546 wherein there is disclosed a storage rack system to provide for the storage of three pallets deep.

SUMMARY OF THE INVENTION

It is the general object of the invention to provide a storage rack system for storing pallet loads of multiple pallets deep comprising a construction that involves a minimum cost of both manufacture and installation.

Another object of the invention is to provide a storage rack system of the indicated type which incorporates a track means for guiding a plurality of carts along the depth of the system wherein there are provided carts movable from a forward position to back position for storing pallet loads of seven pallets deep.

In my pending application Ser. No. 07/910,496, filed Jul. 8, 1992, there is disclosed, in FIGS. 1-13, a seven deep storage rack system comprising a first set of carts associated with a first track means for supporting the first set of carts for movement from forward and back positions, said first set of carts including four carts for supporting loads up to five pallets deep, and including a second set of carts associated with a second track means elevated relative to the first track means for supporting the second set of carts for movement from forward and back positions, the second set of carts including a fifth cart and a sixth cart for storing pallet loads at the sixth and seventh deep positions. An object of the invention is to provide a seven deep, single cart system wherein all six carts are stored on two pairs of rails on the same level.

The storage rack system of the above-identified type is particularly suited for use in ripening rooms for various products such as bananas, tomatoes, and avocados. The benefits of the storage rack system is that it allows a greater density of storage and in combination with the appropriate height can store in a convenient arrangement two full truck loads of fruit products as compared with a lesser amount in a comparable present-day storage arrangement. Further when used in conjunction with ripening rooms, the storage rack of the indicated type can be constructed and arranged to store the product loads flush up against each other to form a compact, air-tight type of loading arrangement by the use of level carts.

Another feature of the storage rack system in accordance with the invention is that it is designed to employ similar carts and use similar components therein involving similar welding procedures whereby all the carts are inherently the same design and construction to thereby reduce the overall cost of the storage rack. Further in this regard, the carts can employ commercially available structural steel components and forms.

In my pending application Ser. No. 07/910,496, filed Jul. 8, 1992, there is disclosed, in FIGS. 14-20, a seven deep storage rack system comprising a set of carts including a first individual cart adapted to store a single pallet load, and two double carts each adapted to support two pallet loads. This storage rack system is adapted to be used with fork-lift trucks of the type known as deep reach trucks, which are constructed and arranged so that the pallet load can be placed either two pallets deep or one pallet deep on the storage rack. An object of this invention is to provide an improved seven deep, double cart system of this type wherein the connection between the two double carts acts as a shock absorber. A feature of the double carts in accordance with the invention is that each comprises two individual carts connected together, each cart being capable of supporting an individual pallet load independently of the cart connected thereto. This independent connection also permits the carts to be installed individually in the track system and interconnected while positioned in their installed condition on the track means. This arrangement is less cumbersome than a double cart extending the full length of two pallet loads since such a cart is difficult to handle because of its size and construction.

DETAILED DESCRIPTION OF THE PREFERRED EMBODIMENTS

Figure 1:
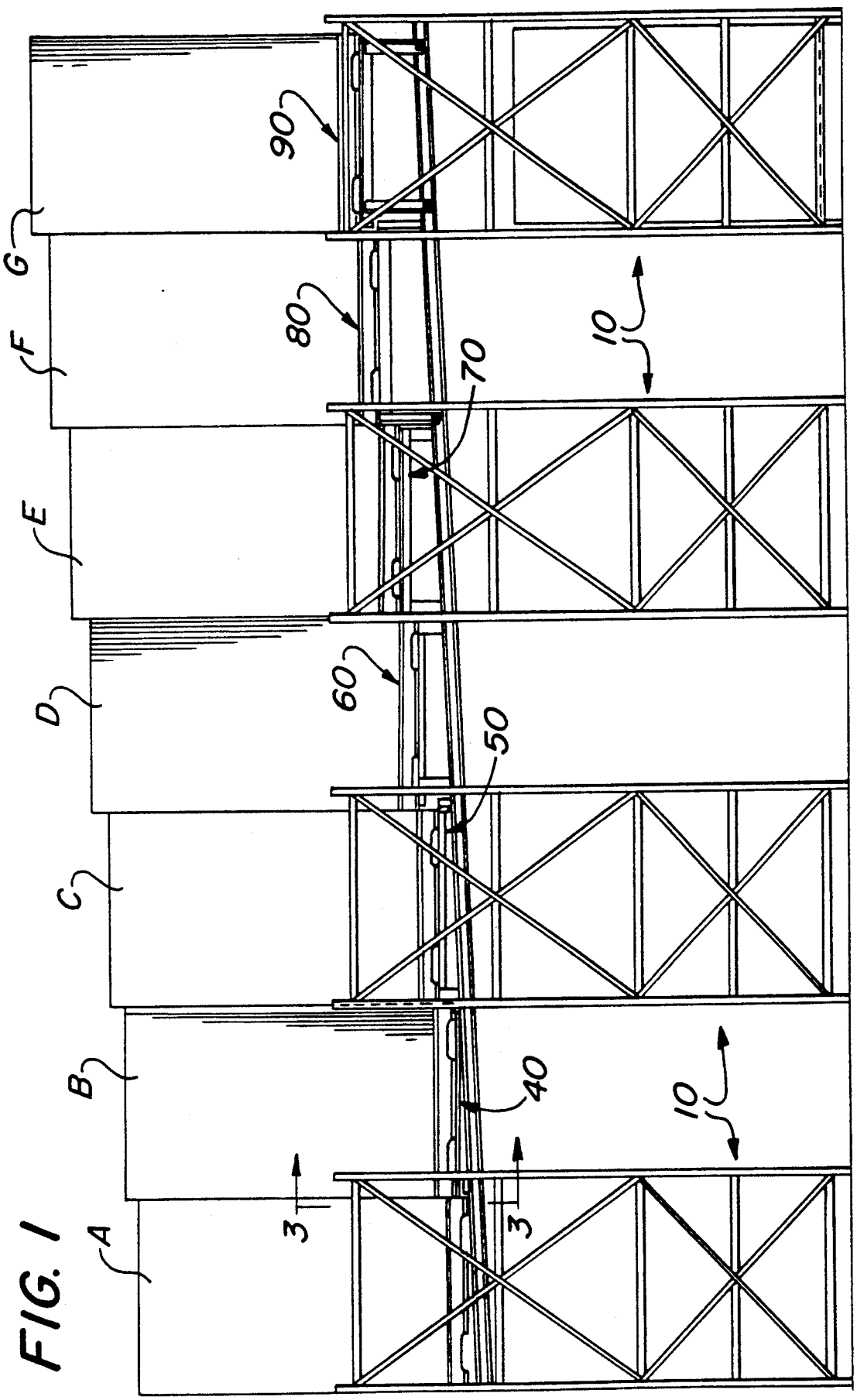
FIG. 1 is a side elevational view illustrating a first embodiment of a storage rack system in accordance with the invention.
Figure 2:
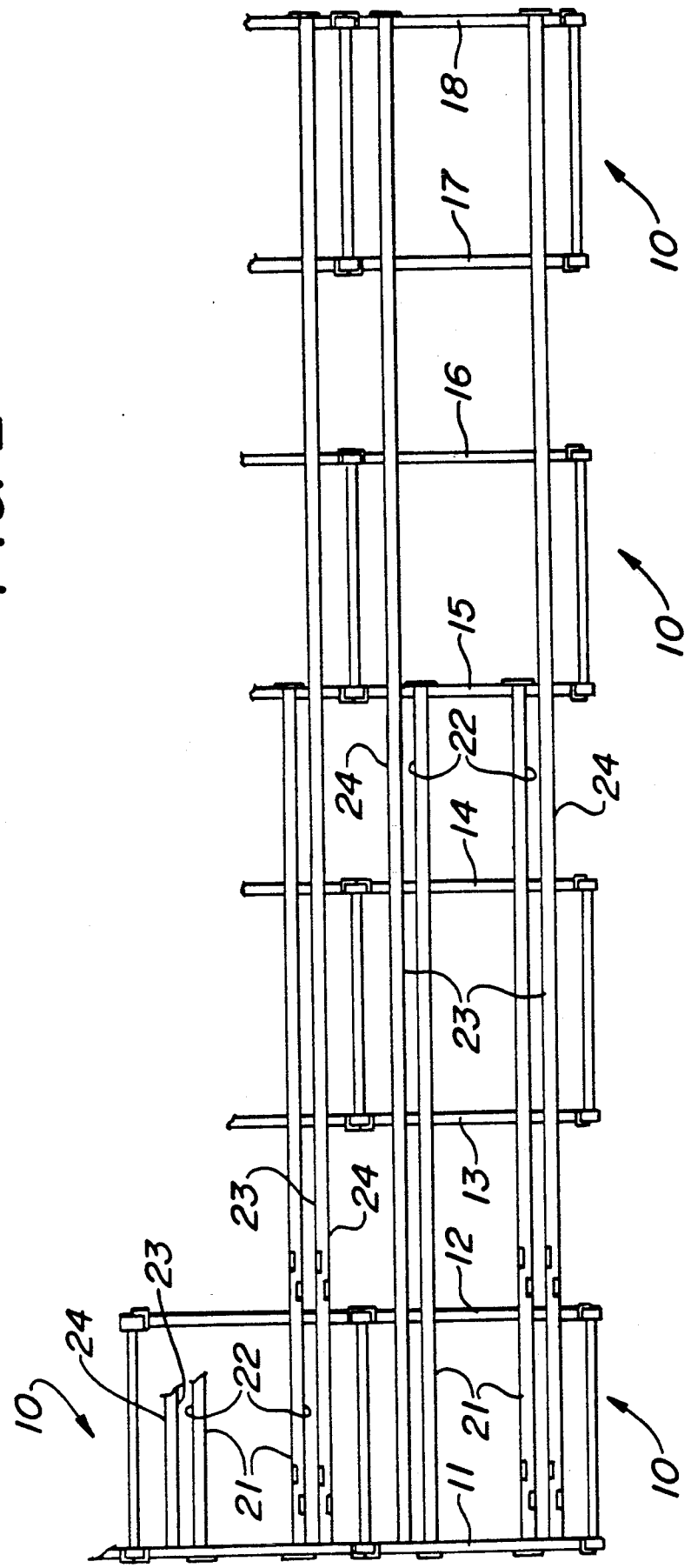
FIG. 2 is a top plan view, partially broken away, showing the track system of the embodiment shown in FIG. 1.
Figure 3:
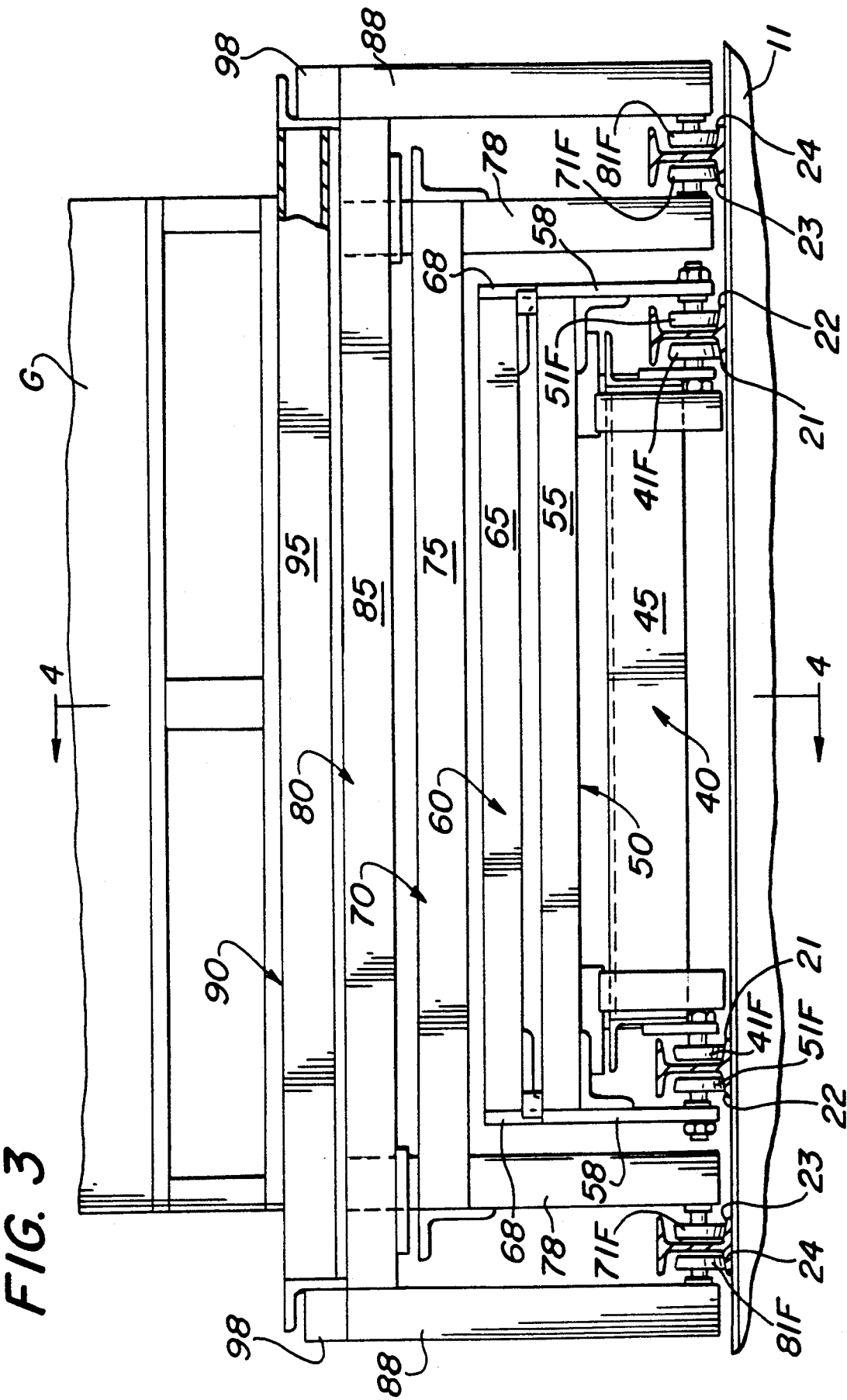
FIG. 3 is a sectional view taken generally on line 3—3 of FIG. 1.

In FIGS. 1-12 there is shown a storage rack system in accordance with the invention adapted to store pallet loads of seven pallets deep. This system comprises a framework providing a plurality of storage bays each of which is defined by a plurality of uprights and horizontal shelf beams constructed and arranged in a generally conventional arrangement, such as, for example, the storage racks manufactured by Frazier Industrial Company. The framework is shown only partially in the drawings but is shown in more detail in said U.S. Pat. Nos. 4,494,852 and 4,955,489.

Each of the storage bays is constructed of a depth to accommodate two rows of pallets. There are provided a plurality of vertically extending upright frames 10 each of which is comprised of a pair of upright columns joined by horizontally extending ties and, where needed, crossbrace members, this frame structure being conventional in the art and being employed in the storage racks of Frazier Industrial Company. Each of the upright columns on the right side of the storage bay is connected with a corresponding upright column on the left side of a storage bay by means of a plurality of horizontal shelf beams including a front shelf beam 11, six interior shelf beams 12-17 and a rear shelf beam 18. The interior shelf beams 12-17 are connected, by means of bolts and connectors, at their ends with aligned columns of upright frames. This connection design is conventional, the arrangement of the upright frames and horizontal shelf beams being described in detail in said prior patents, and serves to provide support means for the pallets containing the stored loads and to support the track means and carts for positioning the pallet loads in the storage bays. Each storage bay is of a size to contain two rows of pallets each seven deep.

For each row of pallets, there is provided a first track means extending along the depth of the storage bay. The track means is adapted to support a set of carts for movement along said track means from forward positions to back positions, said set of carts comprising six carts 40, 50, 60, 70, 80, and 90. The track means and the associated set of carts in effect provide a seven deep storage system.

Referring to the drawings, the track means comprises two pairs of structural members or rails having an I-shaped cross-section constructed and arranged to provide four pairs of associated tracks, namely, a pair of first tracks 21, a pair of second tracks 22, a pair of third tracks 23 and a pair of fourth tracks 24. The pair of third tracks 23 and the pair of fourth tracks 24 provided by the outer rails are constructed to extend from the front to the back of the storage bay along the entire depth thereof, while the pair of first tracks 21 and the pair of second tracks 22 provided by the inner rails are adapted to extend only a short distance, namely, in the region of from one to four pallets deep from the entry end of the storage bay. To this end, the first and second tracks 21 and 22 are supported on the shelf beams 11 to 15, and the third and fourth tracks 23 and 24 are supported on shelf beams 11-18.

Figure 4:
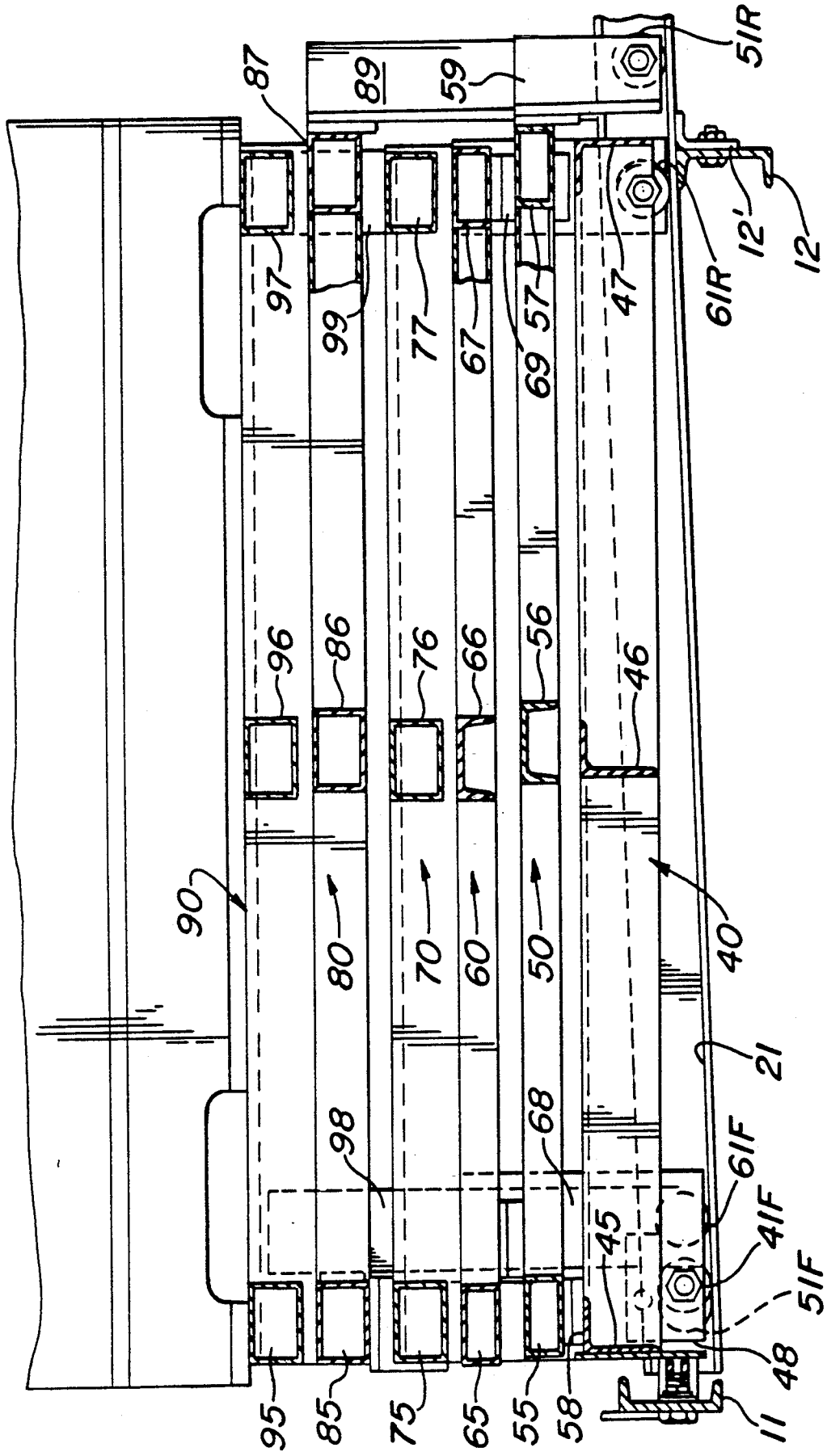
FIG. 4 is a sectional view taken generally on line 4—4 of FIG. 3, with the carts in their forward position.

The first tracks 21 are each provided by the inwardly facing flanges of the I-shaped inner rails, the second tracks 22 are each provided by the outwardly facing flanges of the I-shaped inner rails, the third tracks 23 are each provided by the inwardly facing flanges of the I-shaped outer rails, and the fourth tracks 24 are each provided by the outwardly facing flanges of the I-shaped outer rails. Each structural member or rail providing tracks 21, 22, 23, and 24 of the track means is supported on and secured to a plurality of the shelf beams 11, 12-17, 18 in a conventional manner as known in the art and described in detail in said prior patents. Briefly, each of said I-shaped structural members is bolted to a front shelf beam 11 by means of angle brackets and is supported on interior shelf beams 12-17 and secured thereto by angle brackets 12', as best shown in FIG. 4, the rear shelf beam 18 being mounted so that the I-shaped structural members are secured thereto by the use of suitable brackets.

Figure 5A:
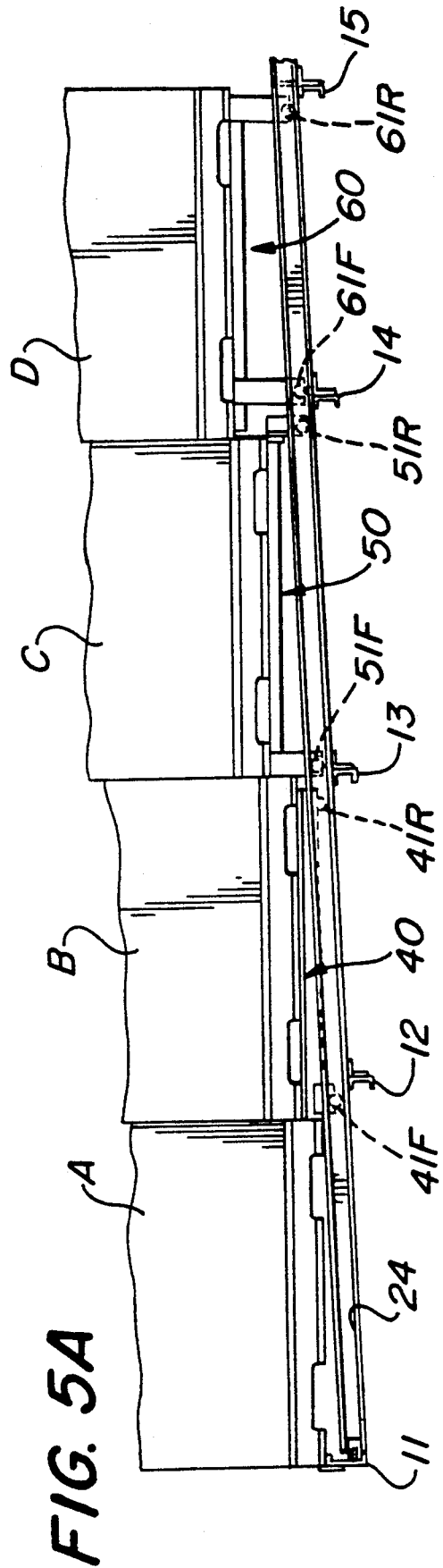
FIGS. 5A and 5B are a side elevational views of the FIG. 1 embodiment of the invention showing the cart system arrangement in detail.
Figure 6A:
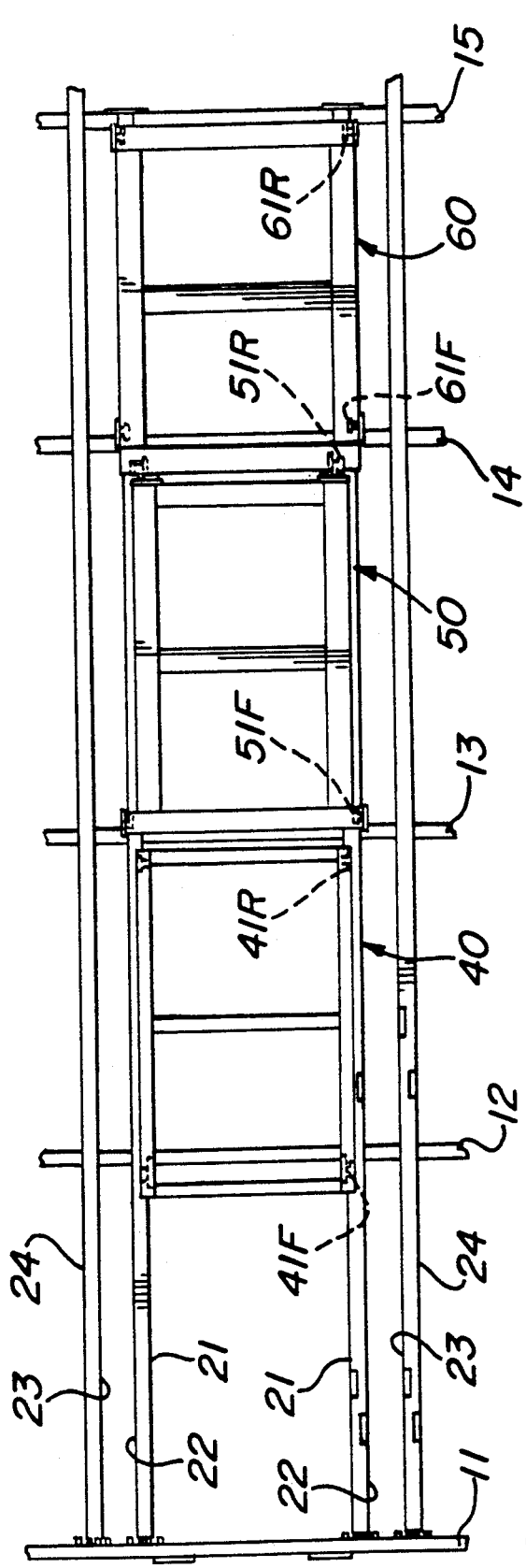
FIGS. 6A and 6B are top plan views of FIGS. 5A and 5B with the pallet loads eliminated to illustrate the top of the cart system.
Figure 5B:
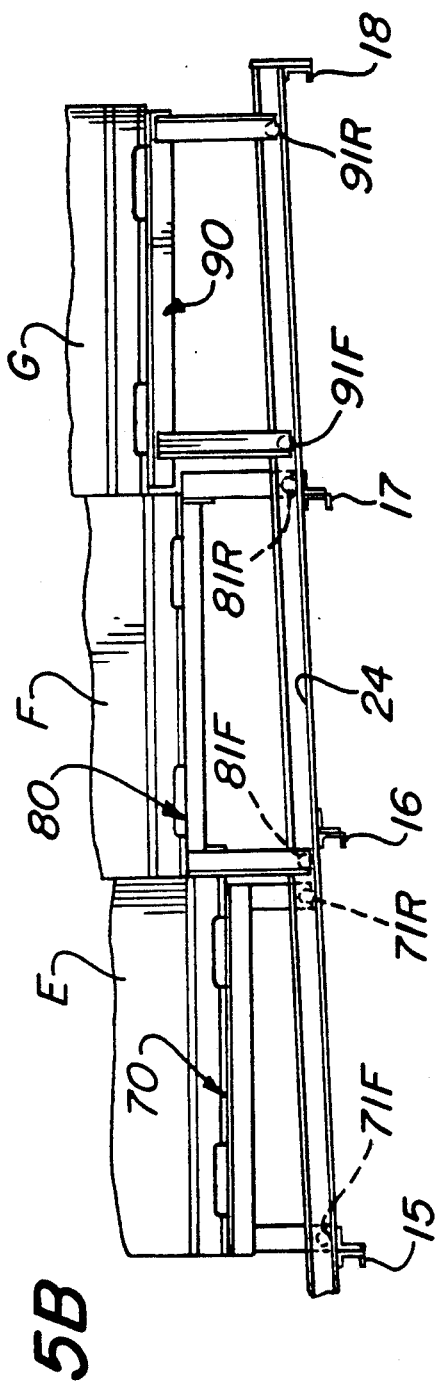
Figure 6B:
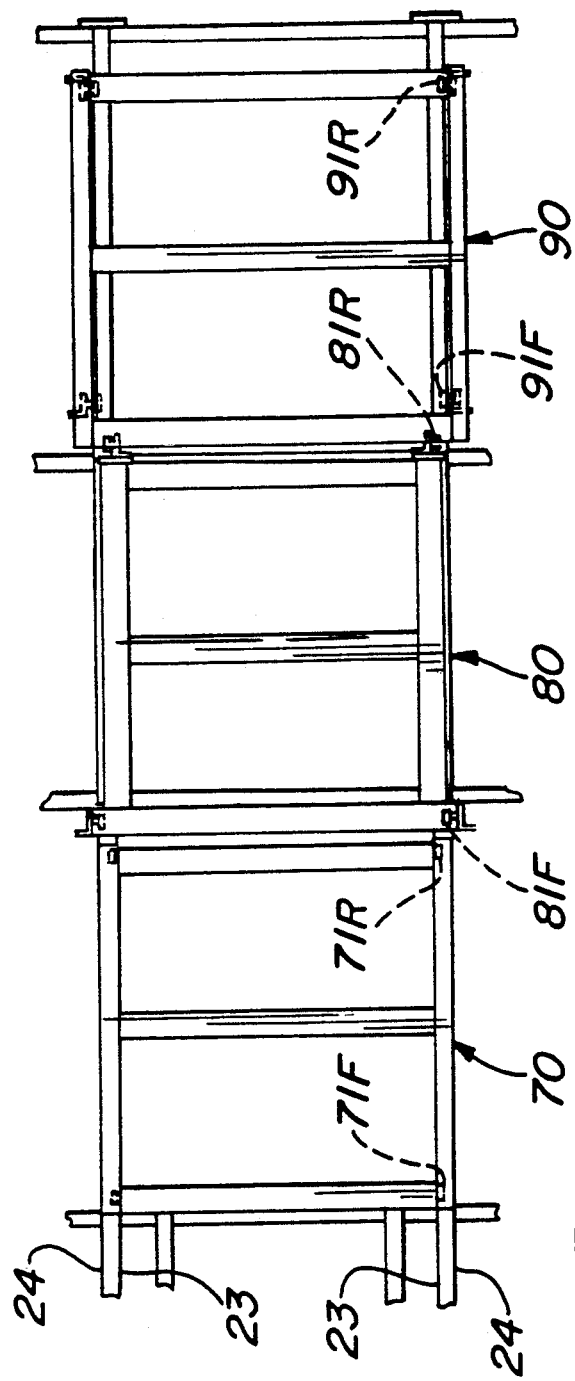

There are provided six carts 40, 50, 60, 70, 80, and 90 which comprise a set of carts constructed and arranged to ride on the track means comprising the four pairs of tracks 21, 22, 23, 24 discussed above, for movement along the depth of the storage bay as will be described in detail hereafter. Briefly stated, each of the carts 40, 50, 60, 70, 80, and 90 is mounted for movement along the track means between a forward position, as shown in FIG. 4, and a back position, as shown in FIGS. 5A and 5B.

Figure 7:
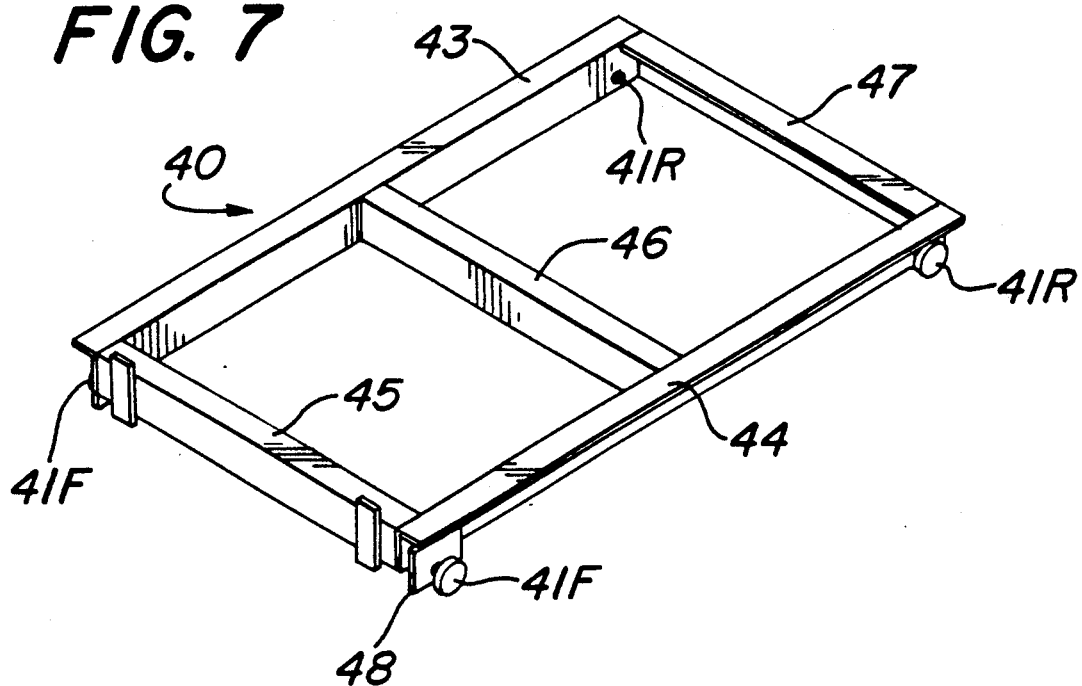
FIGS. 7, 8, 9, 10, 11, and 12 are detailed perspective views of the six carts employed in the storage rack system of FIG. 1.

The first cart 40 includes a rectangular frame formed of a plurality of structural members welded together as best shown in FIG. 7. The frame of cart 40 comprises a pair of side structural angles 43 and 44, a front structural angle 45, a middle structural angle 46 and a rear structural angle 47. Side angles 43 and 44 are welded at their front end to front angle 45. Middle angle 46 and rear angle 47 extend between and are welded at their ends to side angles 43 and 44. A pair of brackets 48 are welded to the front ends of side angles 43 and 44 in an arrangement shown in FIG. 7 to provide a downwardly extending leg portion for supporting the front wheel assemblies 41F of cart 40. There are provided two bearing-type wheel assemblies mounted on each side of the first cart frame at the front and rear ends thereof to provide four rolling supports for cart 40, the front wheel assembly on each side being indicated at 41F and the rear wheel assembly on each side being indicated at 41R. The construction of the wheel assemblies 41F and 41R and their mounting on the first cart frame will be described more fully hereafter. The front wheel assemblies 41F and the rear wheel assemblies 41R ride on the inwardly facing bottom flange portions of the I-shaped structural members forming first tracks 21. The frame for cart 40 is of a size so as to support a pallet load, as indicated by the pallet load B in the arrangement shown in FIG. 5A.

The second cart 50 is manufactured as an independent unit and includes a rectangular frame for providing support for a loaded pallet, a plurality of wheel assemblies 51F and 51R on each side of the cart frame, and means for supporting each of the wheel assemblies 51F, 51R to make rolling contact with the first and second tracks 21 and 22 as cart 50 moves along the depth of the storage bay between a forward and a back position.

Figure 8:
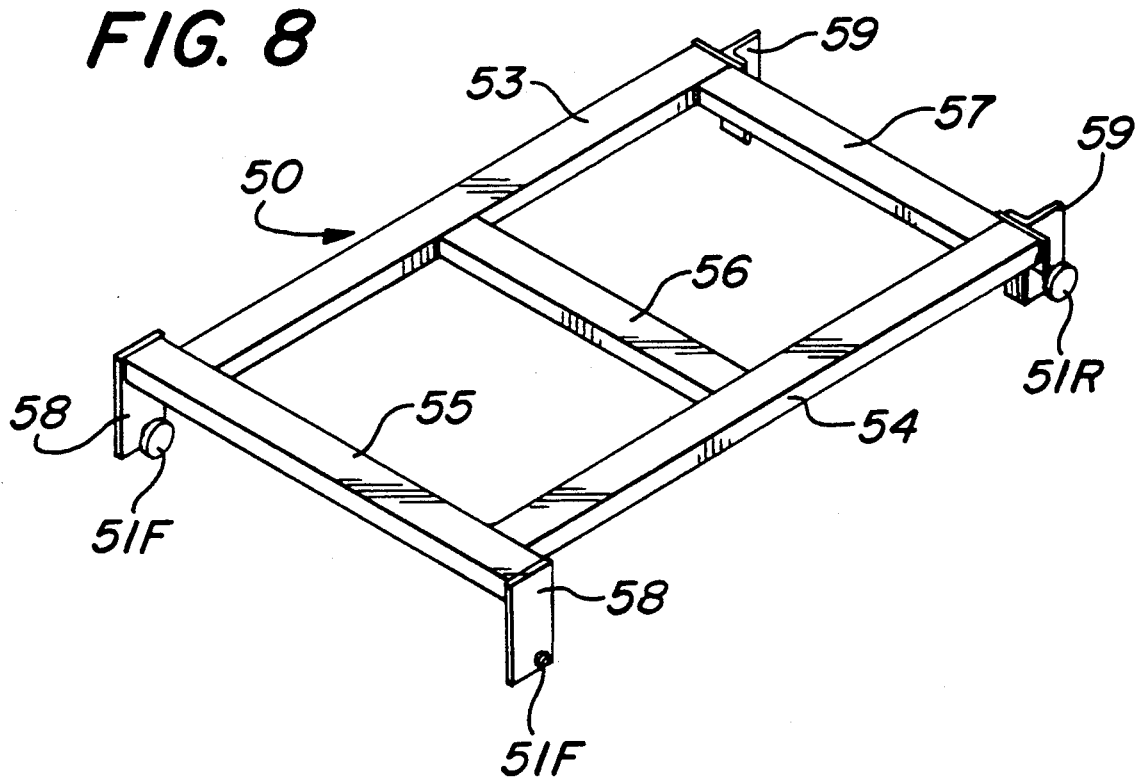

Second cart 50 includes a rectangular frame formed of five structural members welded together as best shown in FIG. 8. Cart 50 comprises a pair of side tubes 53 and 54, a front tube 55, a middle channel 56 and a rear tube 57. A pair of bearing-type wheel assemblies 51F and 51R are welded at the front and rear ends of cart 50 so as to provide four rolling supports for the second cart 50. As best shown in FIG. 8, front tube 55 extends outwardly of side tubes 53, 54 and the front wheel assemblies 51F are mounted on brackets 58 welded on the ends of front tube 55 so as to ride on the outwardly facing bottom flanges of the inner rails providing second tracks 22. The second cart wheel assemblies 51R are mounted on angle brackets 59 welded on the rear end of cart 50 so as to ride on the inwardly facing bottom flange portions of the I-shaped inner rails forming the pair of first tracks 21 at locations rearwardly of the rear wheel assemblies 41R of first cart 40 as shown in FIG. 4. The frame for cart 50 is of a size so as to be able to support a pallet load as indicated by the pallet load C in the arrangement shown in FIG. 5A.

Figure 9:
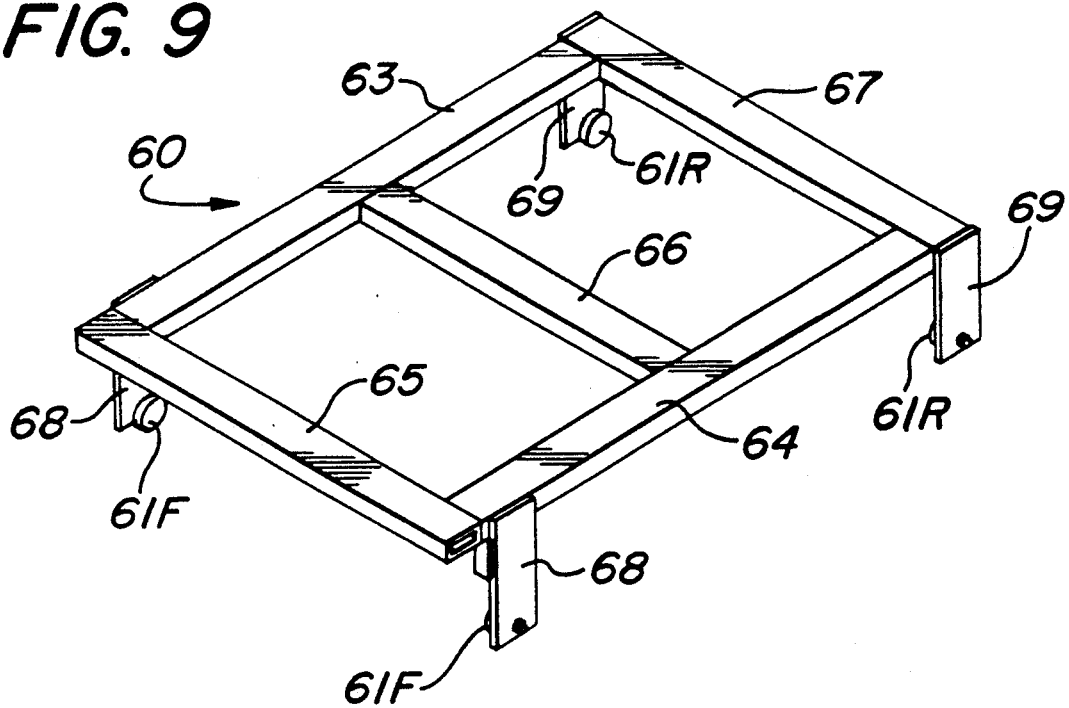

The third cart 60 includes a rectangular frame formed of a plurality of structural members welded together as best shown in FIG. 9. The frame of cart 60 comprises a pair of side structural tubes 63 and 64, a front structural tube 65, a middle structural channel 66 and a rear structural tube 67. Side tubes 63 and 64 are welded at their front ends to front tube 65, as is best shown in FIG. 9. Middle tube 66 and rear tube 67 extend between and are welded at their ends to side tubes 63 and 64. A pair of brackets 68 are welded to the front end of cart 60 to provide downwardly extending leg portions for supporting inwardly facing front wheel assemblies 61F of cart 60 at locations set back from the front end of cart 60. A pair of brackets 69 are welded to the rear end of cart 60 to provide downwardly extending leg portions for supporting inwardly facing rear wheel assemblies 61R of cart 60. The inwardly facing front and rear wheel assemblies 61F and 61R ride on the outwardly facing bottom flange portions of the I-shaped inner rails forming second tracks 22. As shown in FIG. 4, front wheel assemblies 61F ride on tracks 22 at locations rearwardly of front wheel assemblies 51F of cart 50. The frame for cart 60 is of a size so as to support a pallet load, as indicated by the pallet load D in the arrangement shown in FIG. 5A.

Figure 10:
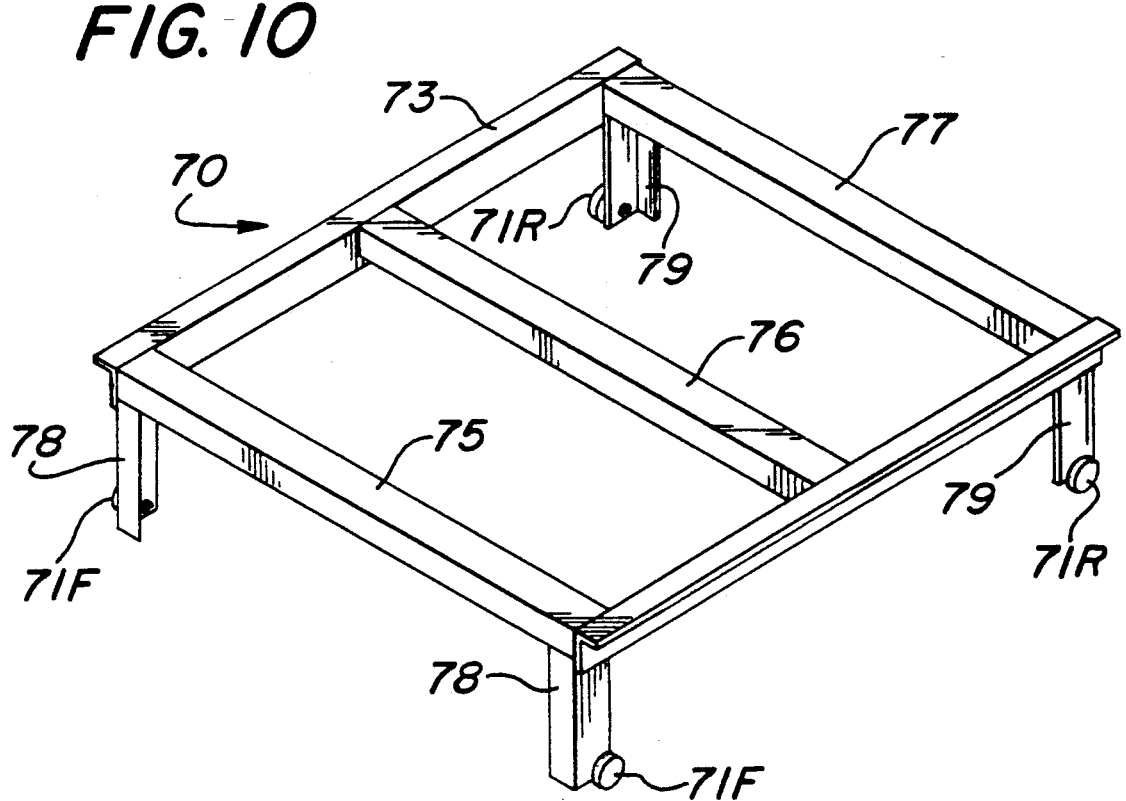

The fourth cart 70 is manufactured as an independent unit and includes a rectangular frame for providing a support for a loaded pallet, a plurality of wheel assemblies 71F and 71R on each side of the cart frame and means for supporting each of the wheel assemblies 71F, 71R to make rolling contact with third tracks 23 as cart 70 moves along the depth of the storage bay between a forward and a back position. Fourth cart 70 includes a rectangular frame formed of six structural members welded together as best shown in FIG. 10. Cart 70 comprises a pair of side angles 73 and 74, a front tube 75, a middle tube 76, and a rear tube 77. A pair of bearing-type wheel assemblies 71F and 71R are mounted at the front and rear ends of side angles 73 and 74 so as to provide four rolling supports for fourth cart 70. To this end, a pair of angle brackets 78 are welded to the front end of cart 70 in an arrangement as best shown in FIG. 10 to provide a downwardly extending leg portion at each end of the tube 75 for supporting outwardly facing front wheel assemblies 71F of cart 70. Also, a pair of angle brackets 79 are welded to the rear end of cart 70 in an arrangement as best shown in FIG. 10 to provide a downwardly extending leg portion at each end of the rear tube 77 for supporting outwardly facing rear wheel assemblies 71R. The fourth cart wheel assemblies 71F and 71R are arranged to ride on the inwardly facing bottom flange portion of the I-shaped outer rails forming the pair of third tracks 23. The frame for cart 70 is of a size so as to be able to support a pallet load as indicated by the pallet load E in the arrangement shown in FIG. 5B.

Figure 11:
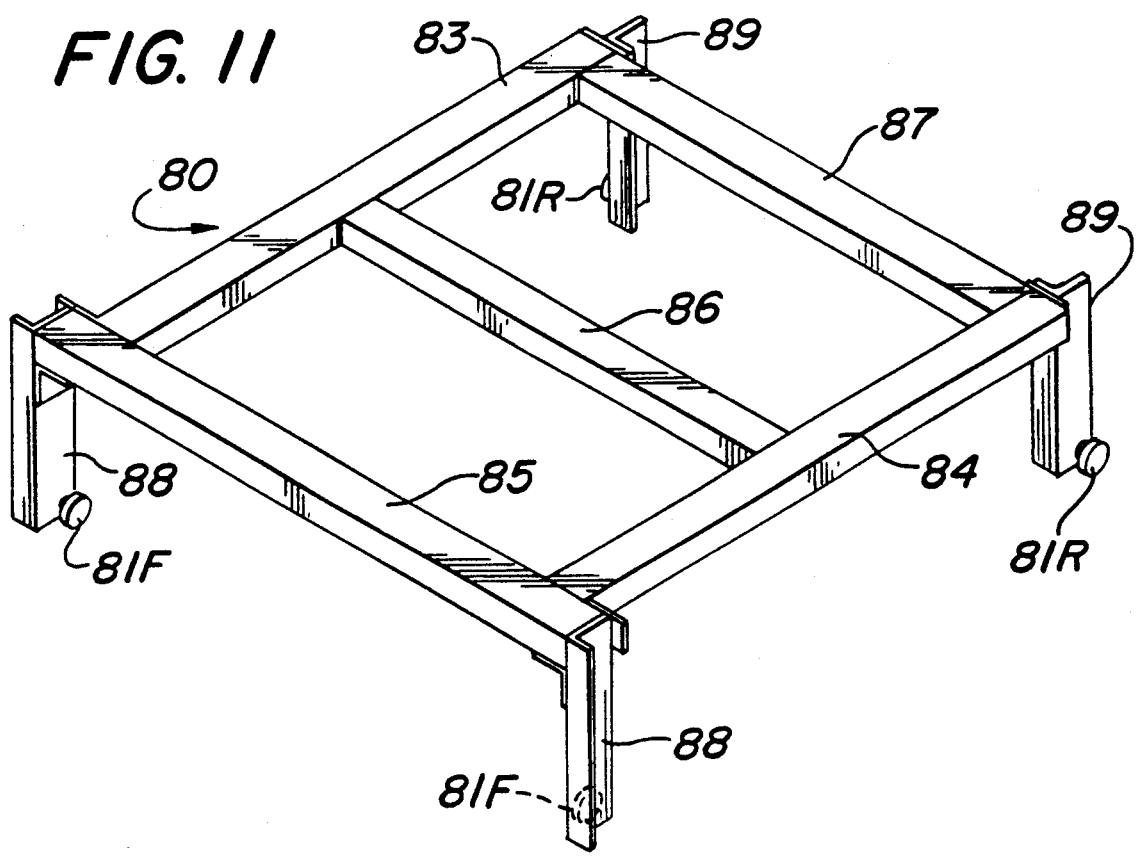

The fifth cart 80 includes a rectangular frame formed of a plurality of structural members welded together as best shown in FIG. 11. The frame of cart 80 comprises a pair of side tubes 83 and 84, a front tube 85, a middle tube 86, and a rear tube 87. Side tubes 83 and 84 are welded at their front ends to front tube 85 at locations spaced inwardly from the end portions thereof as is best shown in FIG. 11. Middle tube 86 and rear tube 87 extend between and are welded at their ends to side tubes 83 and 84. A pair of angle brackets 88 are welded to the ends of front tube 85 in an arrangement shown in FIG. 11 to provide a downwardly extending leg portion at each end of front tube 85 for supporting the front wheel assemblies 81F of cart 80 so as to ride on the outwardly facing bottom flanges of the outer rails providing the fourth tracks 24. Cart 80 has a pair of rear wheel assemblies 81R that are mounted on angle brackets 89 welded on the rear end of cart 80 so as to ride on the inwardly facing bottom flanges of the outer rails forming third tracks 23 at locations rearwardly of the rear wheel assemblies 71R of cart 70. The frame for cart 80 is of a size so as to support a pallet load, as indicated by the pallet load F in the arrangement shown in FIG. 5B.

Figure 12:
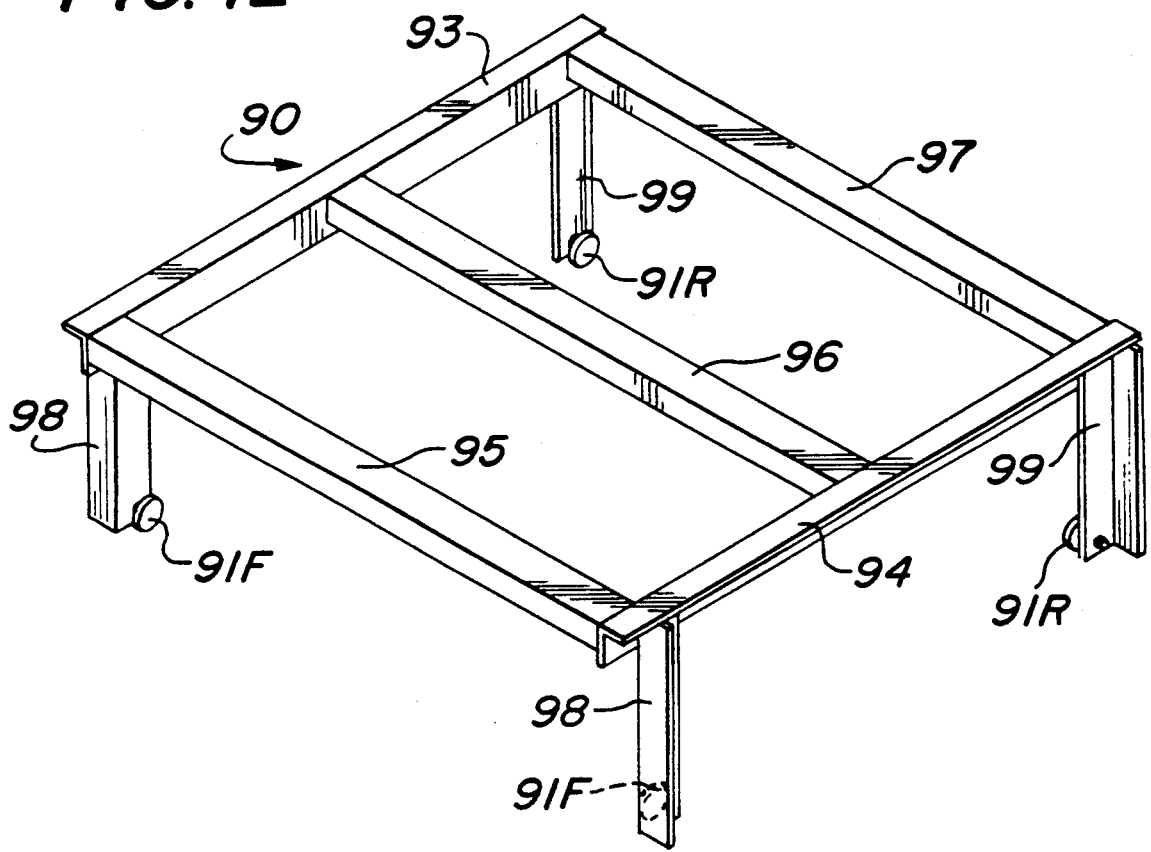
Figure 13:
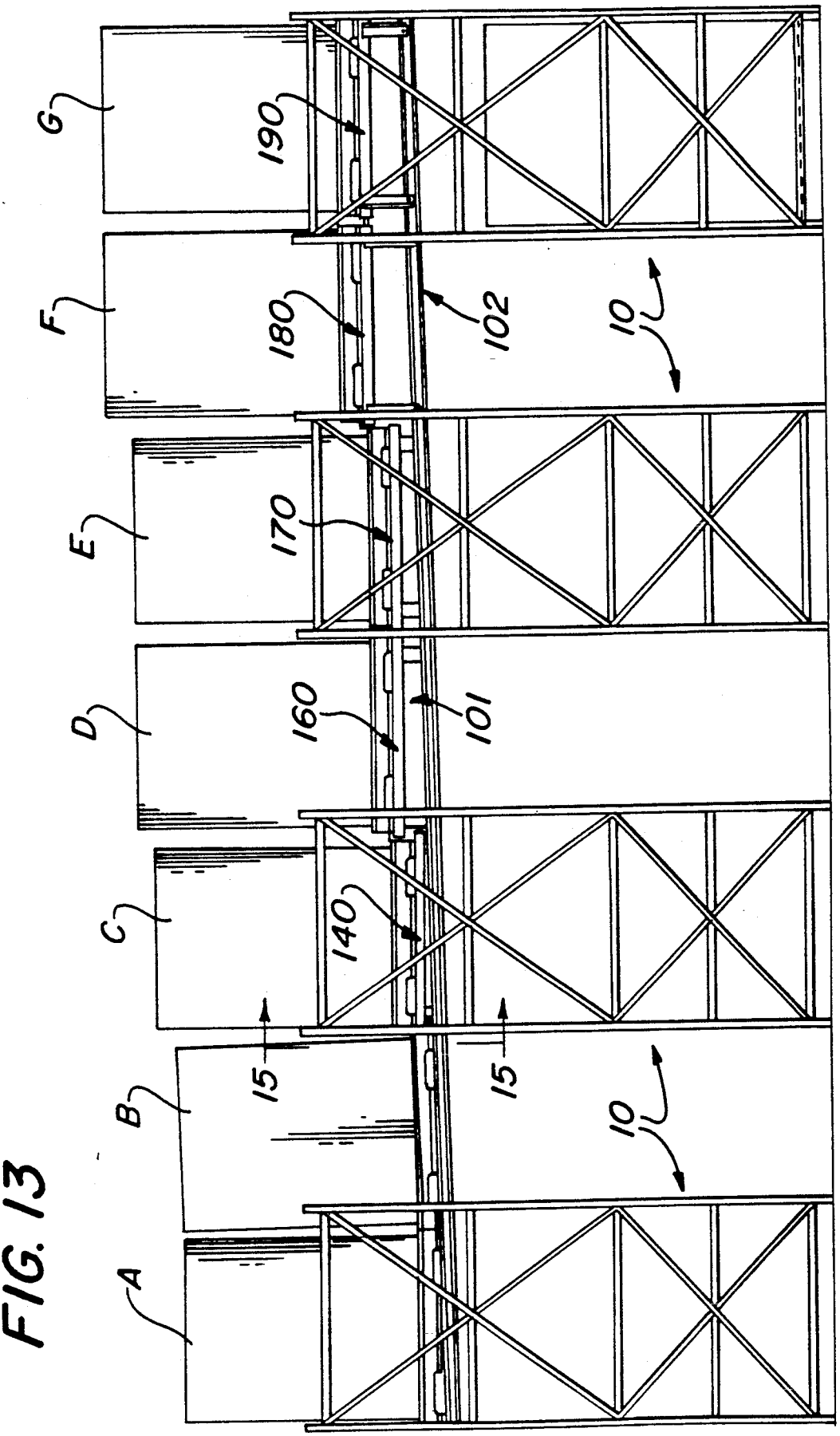
FIG. 13 is a side elevational view illustrating a second embodiment of the invention.
Figure 14:
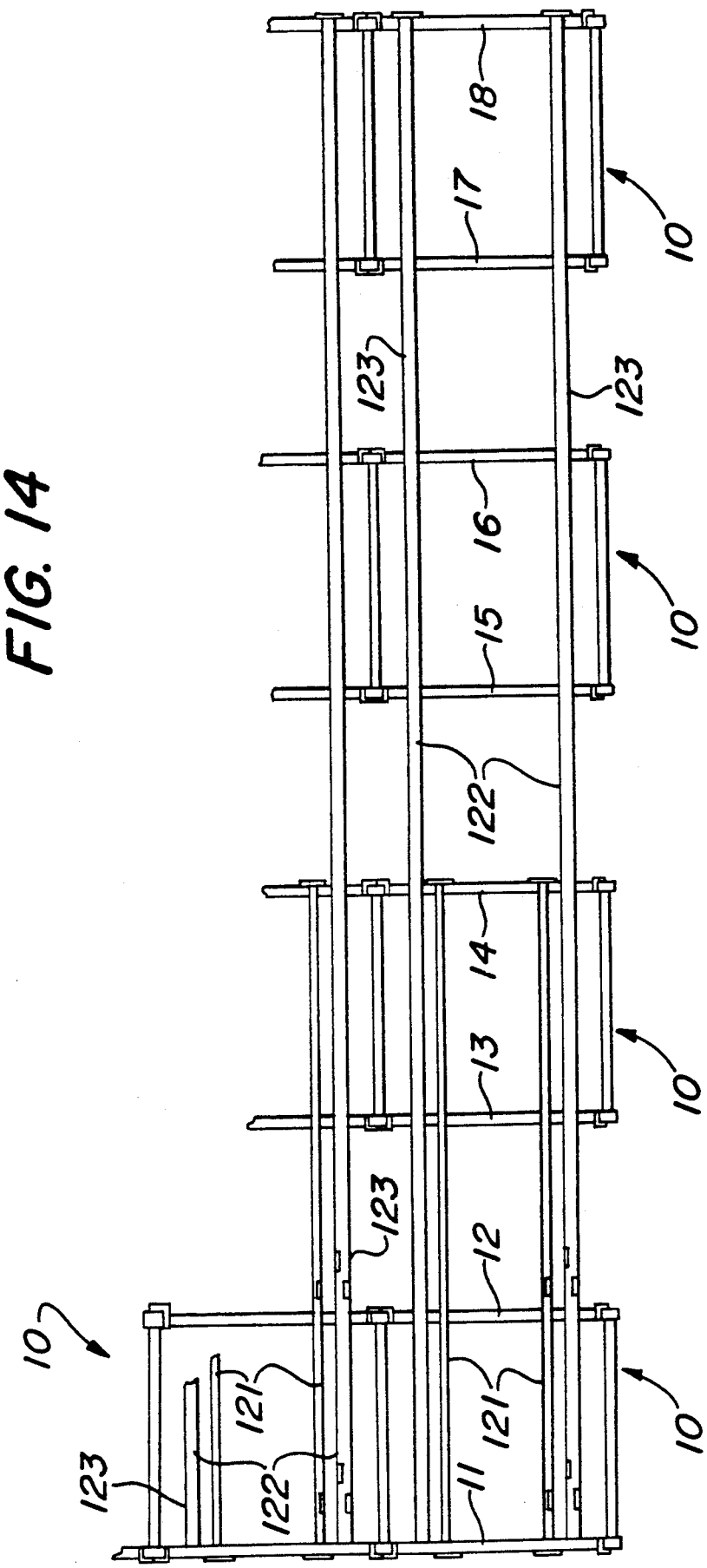
FIG. 14 is top plan view, partially broken away, illustrating the track system for the second embodiment of the invention.

The sixth cart 90 is manufactured as an independent unit and includes a rectangular frame for providing support for a loaded pallet, a plurality of wheel assemblies 91F and 91R on each side of the cart frame, and means for supporting each of the wheel assemblies 91F, 91R to make rolling contact with fourth tracks of the track means as cart 90 moves along the depth of the storage bay between a forward and a back position. Second cart 90 includes a rectangular frame formed of five structural members welded together as best shown in FIG. 12. Cart 90 comprises a pair of side angles 93 and 94, a front tube 95, a middle tube 96 and a rear tube 97. A pair of bearing-type wheel assemblies 91F and 91R are mounted on supports 98 and 99, respectively, welded at the front and rear ends of side angles 93 and 94 so as to provide four rolling supports for the second cart 90. As best shown in FIG. 12, the front wheel assemblies 91F are mounted to be spaced rearwardly a short distance from the front end of the cart 90. The front wheel assemblies 91F ride on the outwardly facing lower flange portions of the outer rails forming the pair of fourth tracks 24 at locations rearwardly of the front wheel assemblies 81F of fifth cart 80. The frame for cart 90 is of a size so as to be able to support a pallet load as indicated by the pallet load G in the arrangement shown in FIG. 5B.

The wheel assemblies for the carts 40, 50, 60, 70, 80 and 90 are of the same general construction and are mounted on vertically extending leg portions of said carts by conventional means and in a manner as described in detail in said prior mentioned patents. Briefly, the mounting means comprises horizontally extending holes punched in vertically extending legs of the wheel supporting brackets with each hole being used to mount wheel assembly. Each of the wheel assemblies has a horizontally extending axle having a threaded reduced diameter portion extending on a horizontal axis through the hole in the vertically extending supporting bracket. Typically, the reduced diameter portion of the axle extends through a pair of washers on the opposite sides of said vertically extending legs and is threadedly engaged with a nut in an arrangement whereby the axle is secured in place to extend on a horizontal axis. A wheel rim is rotatable supported on a hub of the axle by means of roller bearing means positioned between the hub and the wheel rim by conventional sealed roller bearing construction. The wheel rim for the wheel assemblies of carts 40, 50, 60, 70, 80 and 90 is formed with a tapered outer or rolling surface, the taper angle being the same as the taper angle formed on the associated bottom flange portion of the structural members forming tracks 21, 22, 23 and 24.

The carts 40-90 are each mounted into the tracks on which they ride by the use of cut-outs formed in the upper flanges of the structural members forming said tracks, said installation procedure being conventional in the art and being described in detail in my prior application Ser. No. 709,664. Briefly, the cut-outs are located to correspond to the spacing of the wheel assemblies of the associated carts and actual field insertion is achieved by a procedure whereby the cart are tilted at an angle and the leftside wheels are slipped into the lefthand tracks and the cart is maneuvered so that the rightside cart wheels can then be dropped through the track cut-outs into the installed position on the tracks.

In accordance with the invention, cart 40 is arranged so that both its front and rear wheel assemblies 41F and 41R ride on the first tracks 21 as cart 40 moves between a forward position at the entry end of the storage bay and a back position two pallets deep from the entry end of the storage bay. Cart 50 is arranged so that its front wheel assemblies 51F are positioned to ride on the tracks 22 while its rear wheel assemblies 51R ride on tracks 21 rearwardly of wheel assemblies 41R of cart 40 as cart 50 moves between a forward position at the entry end of the storage bay and a back position three pallets deep from the entry end of the storage bay. Cart 60 is arranged so that both its front and rear wheel assemblies 61F and 61R ride on second tracks 22 rearwardly of wheel assemblies 51F of cart 50 as cart 60 moves from a forward position at the entry end of the storage bay and a back position four pallets deep from the entry end of the storage bay. Cart 70 is arranged so that both its front and rear wheel assemblies 71F and 71R ride on the third tracks 23 as cart 70 moves from a front position at the entry end of the storage bay and a back position five pallets deep from the entry end of the storage bay. Cart 80 is arranged so that its front wheel assemblies 81F are positioned to ride on the fourth tracks 24 while its rear wheel assemblies 81R ride on tracks 23 rearwardly of wheel assemblies 71R of cart 70 as cart 80 moves between a forward position at the entry end of the storage bay and a back position six pallets deep from the entry end of the storage bay. Cart 90 is arranged so that both its front and rear wheel assemblies 61F and 61R ride on fourth tracks 24 rearwardly of wheel assemblies 81F of cart 80 as cart 90 moves from a forward position at the entry end of the storage bay and a back position seven pallets deep from the entry end of the storage bay.

The carts 40, 50, 60, 70, 80, and 90 are constructed and arranged so that in their forward position they overlie one another as best shown in FIG. 4. In this position, front wheel assemblies 61F of cart 60 are spaced rearwardly of the forward end of cart 60 so that said front wheel assemblies 61F avoid contact with the front wheel assemblies 51F of cart 50 when said carts 50 and 60 are in the forward positions thereof. This ensures that the front end of cart 60 can be positioned at the front shelf in the forward position of cart 60 so that it is properly positioned to have a pallet load delivered to and removed therefrom at the entry end of the storage bay. Likewise, front wheel assemblies 91F of cart 90 are spaced rearwardly from the forward end of cart 90 so that said front wheel assemblies 91F avoid contact with the front wheel assemblies 81F of cart 80 when said carts 80 and 90 are in the forward positions thereof to thereby ensure that the front end of cart 90 can be positioned at the front shelf 11 in the forward position of cart 90. It is also noted that the rear wheel assemblies 51R of cart 50 are positioned to avoid contact with the rear wheel assemblies 41R of cart 40 when the carts 40 and 50 are in the forward positions thereof in order to ensure that the carts can be positioned at the proper forward position at the front shelf 11. For the same reason, rear wheel assemblies 81R are positioned to avoid contact with rear wheel assemblies 71R when carts 70 and 80 are on the forward positions thereof.

As is described in said prior patents there are provided suitable bumper means for holding the carts 40, 50, 60, 70, 80, and 90 in their forward position at the entry end of the storage bay.

The pairs of tracks 21, 22, 23, and 24 are all mounted on the shelf beams of the framework so that they extend at a slight inclination toward the entry end of the storage bay. As is described in detail in said prior patents, the inclination is achieved by the accurate locating of the position of the supporting structure for the track means and is typically about 5/16 inch for each twelve inches of length.

Figure 18A:
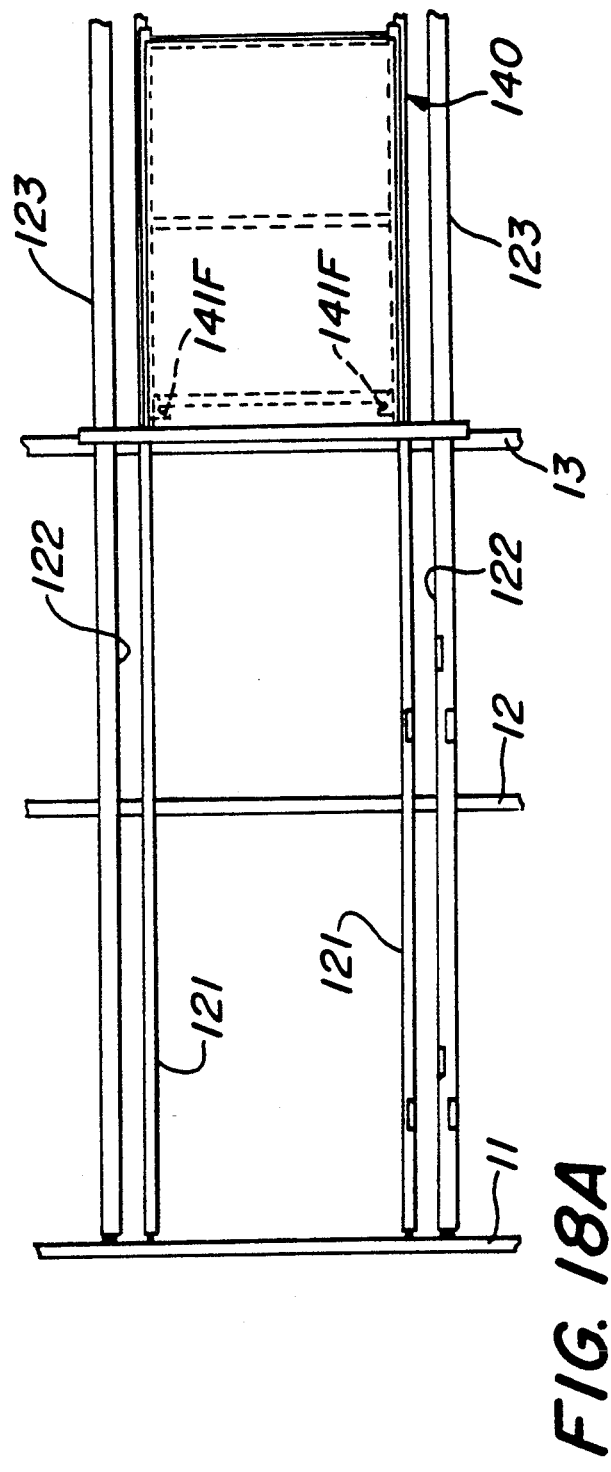
FIGS. 18A and 18B are plan views of FIGS. 17A and 17B with the pallet loads eliminated so as to illustrate the cart system in detail.
Figure 18B:
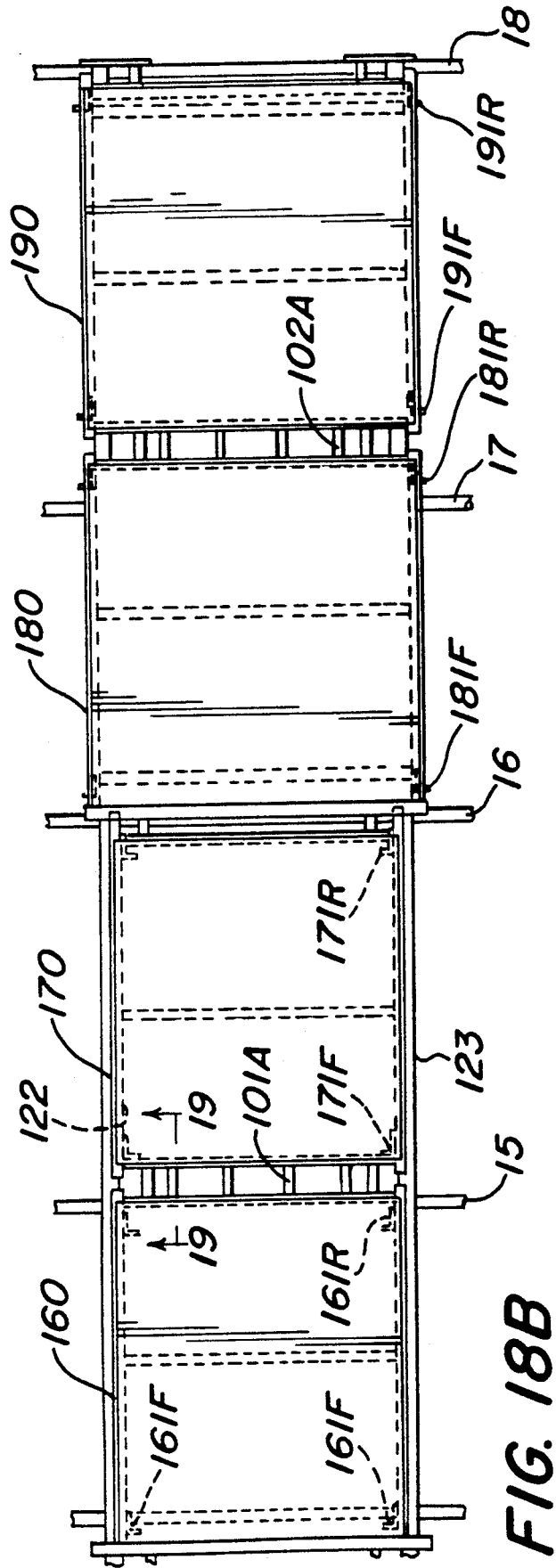

Carts 40, 50, 60, 70, 80 and 90 are constructed so that the pallet supporting top surface of each cart is maintained in a level (ie., horizontal) position on the inclined track means for said carts. This type of cart construction is described in detail in said U.S. Pat. No. 4,955,489 with respect to FIGS. 18-19 thereof. Briefly, this is achieved by making the front wheel assemblies of a larger vertical extent than the rear wheel assemblies for each cart. In other words, the support means for the front wheel assemblies are constructed and arranged so that the front end of the top surface of the cart is spaced from the place of rolling contact with the track an amount greater than that of the rear end thereof so that said top supporting surface is maintained in a horizontal plane while a cart supported on the inclined tracks 21, 22, 23, and 24 rides therealong. Thus, the supporting surface of the cart remains level even though the cart moves along an inclination as it moves between its forward and back positions on the inclined tracks supporting the same.

As is apparent from a consideration of the drawings, the forward position of carts 40, 50, 60, 70, 80 and 90 are located at the entry end of the storage bay, the back position of first cart 40 being two pallets deep from the entry end of the storage bay, the back position of second cart 50 being three pallets deep from the entry end of the storage bay, the back position of third cart 60 being four pallets deep from the entry end of the storage bay, the back position of fourth cart 70 being five pallets deep from the entry end of the storage bay, the back position of fifth cart 80 being six pallets deep from the entry end of the storage bay, and the back position of sixth cart 90 being seven pallets deep from the entry end of the storage bay. Thus, each row of the storage bay can store seven pallet loads A, B, C, D, E, F and G in an arrangement as best shown in FIGS. 5A, 5B. The front pallet supported load A is supported on the track means on the two pairs of I-shaped structural members or rails forming the tracks 21-24, the pallet load B is supported on first cart 40, the pallet load C is supported on the second cart 50, the pallet load D is supported on the third cart 60, the pallet load E is supported on the fourth cart 70, the pallet load F is supported on fifth cart 80 and the pallet load G is supported on the sixth cart 90.

The pallet loads A, B, C, D, E, F and G will be placed in the position shown in FIGS. 5A, 5B by a conventional push-back loading technique employing conventional fork trucks, which technique is well known in the art and described in detail in said prior patents. Thus, the first pallet load G to be stored will be placed on the empty sixth cart 90 which has assumed its position at the entry end of the storage bay as described above. When it is desired to store the second pallet load F in the storage bay, the fork truck approaches the storage rack at an elevation such that the fork truck and the second pallet load F gently nudge the first load G toward the rear, whereby said first load G and cart 90 supporting the same will be pushed rearwardly toward the rear of the storage rack up to the point where the fork truck can place the load F onto the empty fifth cart 80. When it is desired to store a third pallet load E, the fork truck with the said third load E approaches the storage rack and the pallet load E gently nudges the first two loads F and G toward the rear whereby the loads F and G, and the carts 80 and 90 supporting the same, are pushed back rearwardly toward the rear of the storage rack up to the point where the fork truck can place the load E on the empty fourth cart 70. When the fourth load D is to be stored, the fork truck with the pallet load D thereon gently nudges the other pallet loads E, F and G supported on carts 70, 80 and 90, respectively, toward the rear of the storage rack until the storage truck can deposit the fourth load D on the empty third cart 60. When the fifth pallet load C is to be stored, the fork truck with the pallet load C thereon gently nudges the other pallet loads D, E, F and G supported on carts 60, 70, 80 and 90, respectively, toward the rear of the storage rack until the fork truck can deposit the fifth load C on the empty second cart 50. When the sixth pallet load B is to be stored, the fork truck with the pallet load B thereon gently nudges the other pallet loads C, D, E, F and G supported on carts 50, 60, 70, 80 and 90, respectively, toward the rear of the storage rack until the fork truck can deposit the sixth load B on the empty first cart 40. When the seventh pallet load A is to be stored, the fork truck with the pallet load A thereon gently nudges the other pallet loads B, C, D, E, F and G supported on carts 40, 50, 60, 70, 80 and 90, respectively, toward the rear of the storage rack until the fork truck can deposit the seventh load A on the two pairs of structural members providing tracks 21-24 and the front shelf beam 11 at the forward loading position at the entry end of the storage bay. In this manner the row of the storage rack is fully loaded with seven pallet loads. In order to unload the seven pallet loads, a procedure which is essentially the reverse of the above-described procedure is employed.

In FIGS. 13-22, there is shown a storage rack system in accordance with the invention for storing seven pallets deep, which system comprises a lower first cart 140, a middle first cart assembly 101 comprising a second cart 160 and a third cart 170, and a upper second cart assembly 102 comprising a fourth cart 180 and a fifth cart 190. The track means for the embodiment shown in FIGS. 13-22 comprises a C-shaped structural member forming tracks 121 and an I-shaped structural member forming tracks 122 and 123, which structural members are supported on the shelf beams 11-18 in the same manner as described above in respect to the embodiments shown in FIGS. 1-12. The embodiment of FIGS. 13-22 comprises a framework, including upright frames 10 and shelf beams 11-18, constructed and arranged essentially the same as that employed in the embodiment of FIGS. 1-12 and which provides a plurality of storage bays adapted to contain two pairs of track means for storing two rows of pallets seven deep, wherefore corresponding parts have been given the same reference numerals.

The embodiment shown in FIGS. 13-22 is adapted for use with forklift trucks of the type known as "deep-reach" trucks, which are adapted to reach back into the storage bay to pick up and deposit a pallet load at a location either one pallet deep or two pallets deep from the entry end of the storage bay.

Briefly stated, the pairs of associated tracks 121, 122, and 123 are adapted to support the lower first cart 140, the middle first cart assembly 101 and the upper second cart assembly 102 in a manner for guiding the same for movement along the depth of the storage bay between forward and back positions. The forward positions of cart 140 and cart assemblies 101 and 102 are located at the entry end of the storage bay such that cart 160 overlies cart 140 and cart 180 overlies cart 160 at the entry end of the storage bay. The back position of cart 140 is three pallets deep from the entry end of the storage bay, the back position of cart assembly 101 is such that cart 160 is four pallets deep from the entry end of the storage bay and cart 170 is five pallets deep from the entry end of the storage bay, and the back position of cart assembly 101 is such that cart 180 is six pallets deep from the entry end of the storage bay and cart 190 is seven pallets deep from the entry end of the storage bay. The front pallet supported load A is supported on the track means, the second pallet supported load B is supported on the track means adjacent load A, the pallet supported load C is supported on cart 140, the pallet supported load D is supported on cart 160, the pallet supported load E is supported on the cart 170, the pallet supported load F is supported on the cart 180, and the pallet supported load G is supported on the cart 190. The pallet loads A-G are placed in the position shown in FIGS. 17A and 17B by conventional push-back loading techniques utilizing the deep reach forklift trucks as is well known in the art.

Referring to the drawings, the track means comprises three pairs of associated tracks, namely, a pair of inner first tracks 121, a pair of middle second tracks 122 and a pair of outer third tracks 123. The pair of second tracks 122 and the pair of third tracks 123 are constructed to extend from the front to the back of the storage bay along the entire depth thereof, while the pair of first tracks 121 are adapted to extend only a short distance, namely, in the region of from one to three pallets deep from the entry end of the storage bay. To this end, the first tracks 121 are supported on the shelf beams 11, 12, 13, and 14.

The first tracks 121 are each provided by a structural member having a C-shaped cross-section, each being arranged to provide inwardly facing flanges. The second and third tracks 122,123 are each provided by a structural member having an I-shaped cross-section, said members being arranged to provide a pair of inwardly facing flanges which provide the second tracks 122 and a pair of outwardly facing flanges which provide the third tracks 123. Each structural member providing tracks 121, 122, and 123 of the track means is supported on and secured to a plurality of the shelf beams 11, 12-17, 18 in a conventional manner as known in the art and described in detail in said prior patents.

Figure 15:
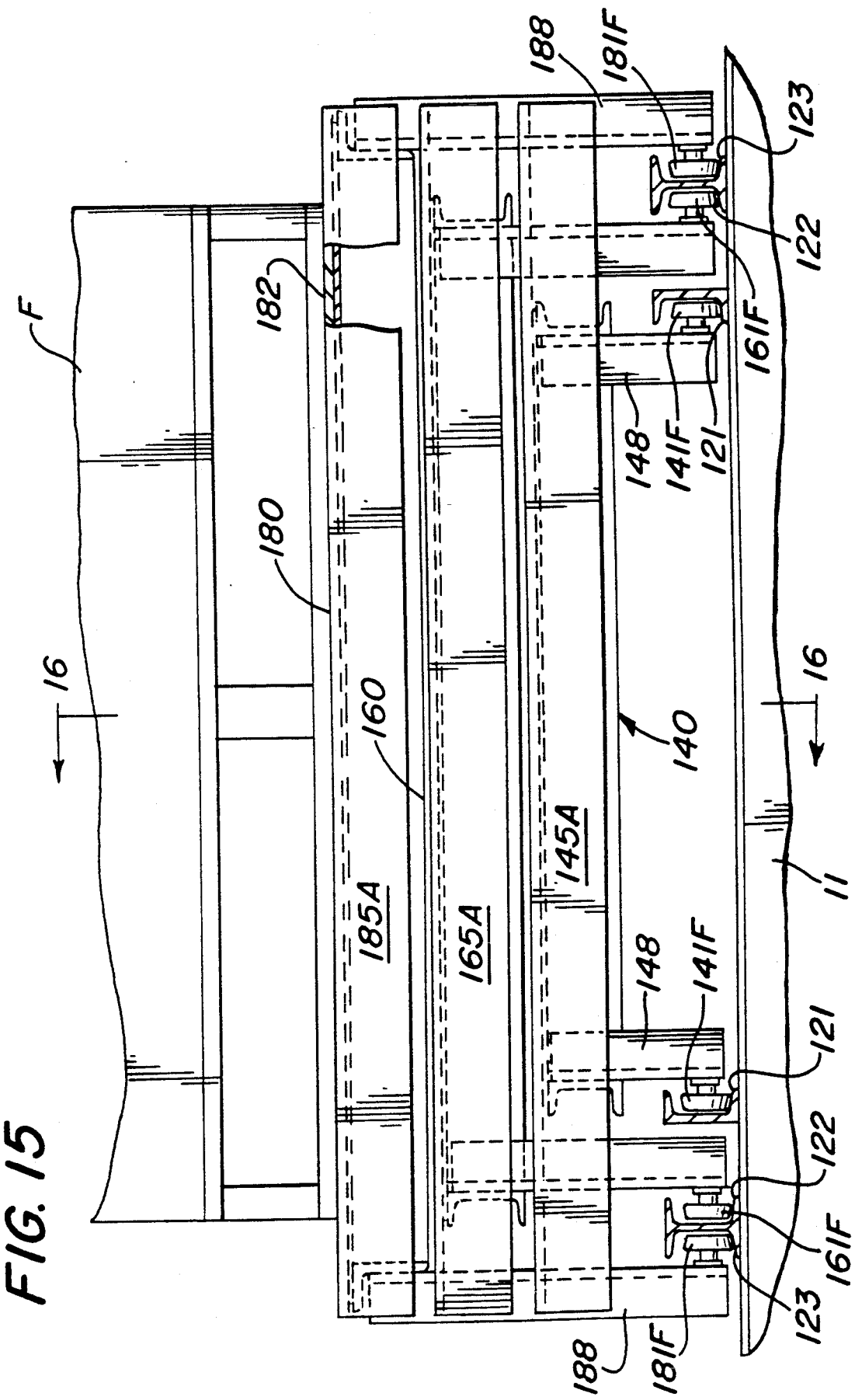
FIG. 15 is a sectional view taken generally on line 15—15 of FIG. 13 with the carts in their forward position.
Figure 16:
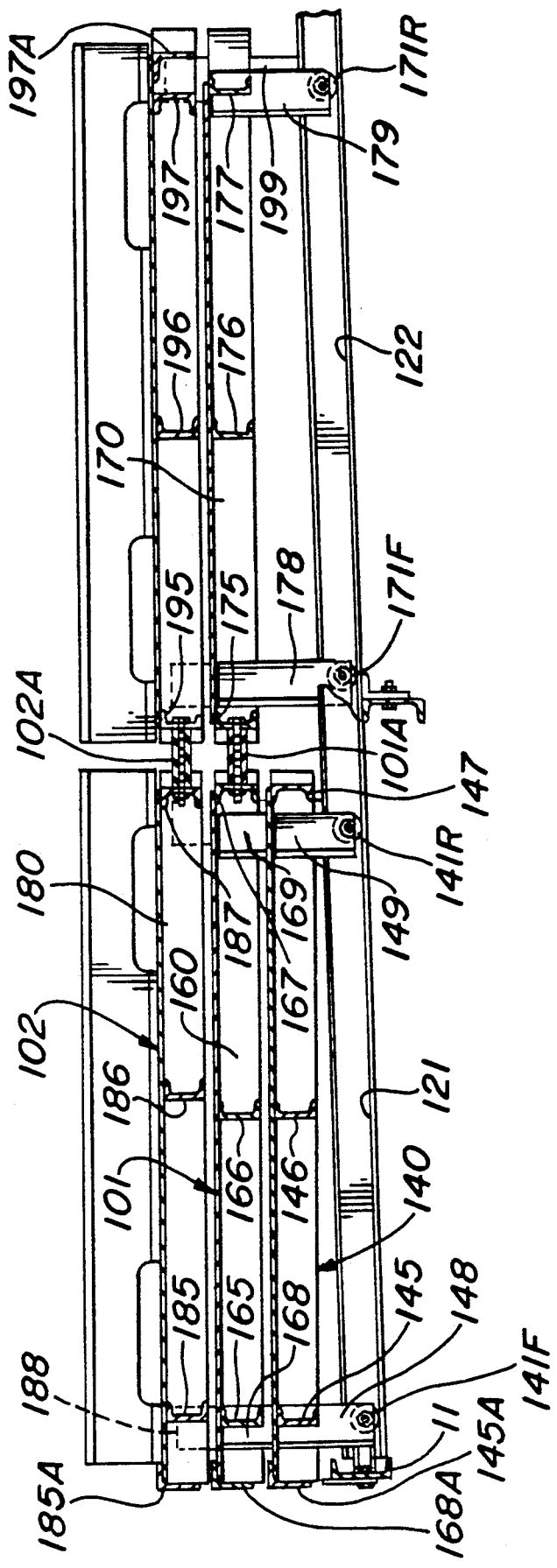
FIG. 16 is a sectional view taken generally on line 16—16 of FIG. 15.
Figure 20:
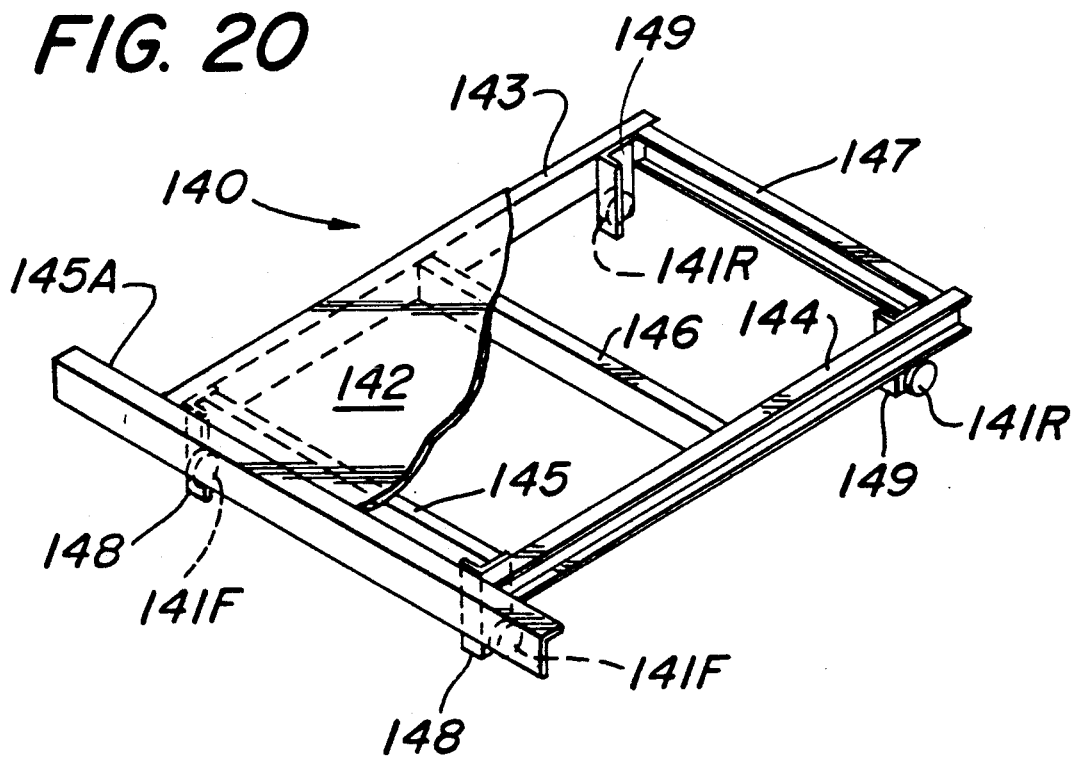
FIGS. 20, 21, and 22 are detailed perspective views illustrating the carts employed in the second embodiment of the invention.

The first cart 140, which may be termed the lower cart, includes a rectangular frame formed of a plurality of structural members welded together as best shown in FIG. 20. The frame of cart 140 comprises a pair of side structural channel 143 and 144, a front structural channel 145, a middle structural channel 146 and a rear structural channel 147. Side channels 143 and 144 are welded at their front end to a front angle 145A at locations spaced inwardly from the end portions thereof as is best shown in FIG. 20. Middle channel 146 and rear channel 147 extend between and are welded at their ends to side channels 143 and 144. A rectangular support plate 142 is mounted on top of frame members 143-147. A pair of angle brackets 148 are welded to the front end of cart 140 in an arrangement shown in FIG. 20 to provide a downwardly extending leg portion for supporting the front wheel assemblies 141F of cart 140. Similarly, a pair of angle brackets 149 are welded to the rear end of the frame of cart 140 for supporting the rear wheel assemblies 141R of cart 140. Thus, there are provided two bearing-type wheel assemblies mounted on each side of the first cart frame at the front and rear ends thereof to provide four rolling supports for cart 140, the front wheel assembly on each side being indicated at 141F and the rear wheel assembly on each side being indicated at 141R. As best shown in FIGS. 15 and 16, the front and rear wheel assemblies 141F and 141R ride on the inwardly facing bottom flange portions of the C-shaped structural members forming first tracks 121. The frame for cart 140 is of a size so as to support a pallet load, as indicated by the pallet load C in the arrangement shown in FIG. 17A.

Figure 21:
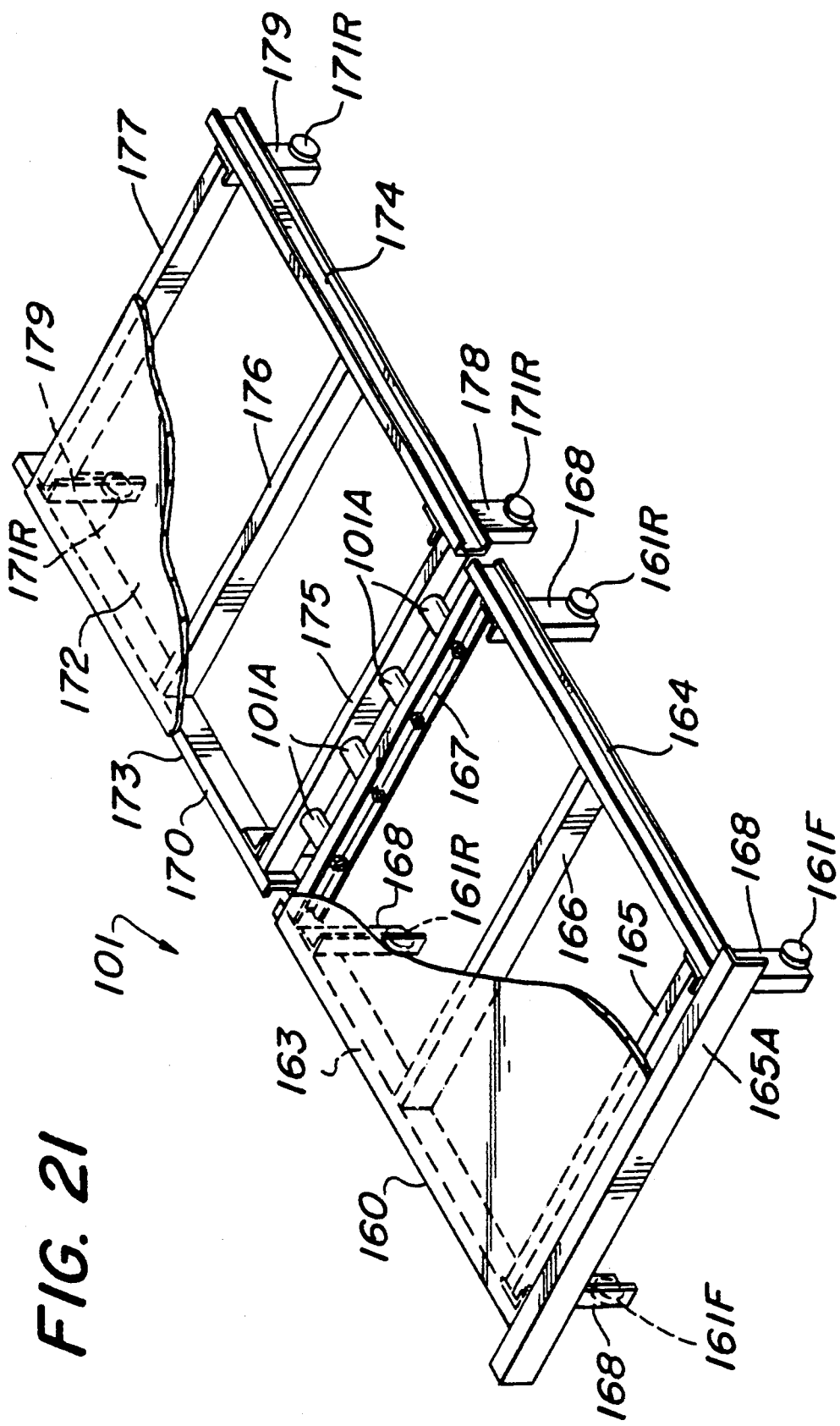

The middle first cart assembly 101 is shown in FIG. 21 and comprises interconnected carts 160 and 170. Cart 160, which may be termed the forward cart of the first cart assembly 101 includes a rectangular frame formed of a plurality of structural members welded together as best shown in FIG. 21. The frame of cart 160 comprises a pair of side structural channels 163 and 164, a front structural channel 165, a middle structural channel 166 and a rear structural channel 167. Side channels 163 and 164 are welded at their front ends to a front angle 165A at locations inward of the ends thereof. Channels 165, 166, and 167 extend between and are welded at their ends to side angles 163 and 164 at locations shown in FIG. 21. A pair of angle brackets 168 are welded to the front end of cart 160 to provide downwardly extending leg portions for supporting outwardly facing front wheel assemblies 161F of cart 160. A pair of angle brackets 169 are welded to the rear end of cart 160 to provide downwardly extending leg portions for supporting outwardly facing rear wheel assemblies 161R of cart 160. The outwardly facing front and rear wheel assemblies 161F and 161R ride on the inwardly facing bottom flange portions of the structural member forming second tracks 122. A rectangular support plate 162 is mounted on top of frame members 163-167. The frame for cart 160 is of a size so as to support a pallet load, as indicated by the pallet load D in the arrangement shown in FIG. 17B.

The cart 170, which may be termed the rearward cart of the first cart assembly 101, is manufactured as an independent unit and includes a rectangular frame for providing a support for a loaded pallet, a plurality of wheel assemblies 171F and 171R on each side of the cart frame and means for supporting each of the wheel assemblies 171F, 171R to make rolling contact with second tracks 122 as cart 170 moves along the depth of the storage bay between a forward and a back position. Cart 170 includes a rectangular frame formed of six structural members welded together as best shown in FIG. 21. Cart 170 comprises a pair of side channels 173 and 174, a front channel 175, a middle channel 176 and a rear channel 177. A pair of bearing-type wheel assemblies 171F and 171R are mounted at the front and rear ends of side channels 173 and 174 so as to provide four rolling supports for cart 170. To this end, a pair of angle brackets 178 are welded to the cart frame in an arrangement to provide a downwardly extending leg portion at each end of channel 175 for supporting outwardly facing front wheel assemblies 171F of cart 170. Also, a pair of angle brackets 179 are welded to the cart frame in an arrangement to provide a downwardly extending leg portion at each end of the rear channel 177 for supporting outwardly facing rear wheel assemblies 171R. The wheel assemblies 171F and 171R are arranged to ride on the inwardly facing tapered bottom flange portion of the I-shaped structural members forming the pair of second tracks 122. A rectangular support plate 172 is mounted on top of frame members 173-177. The frame for cart 170 is of a size so as to be able to support a pallet load as indicated by the pallet load E in the arrangement shown in FIG. 17B.

Figure 19:
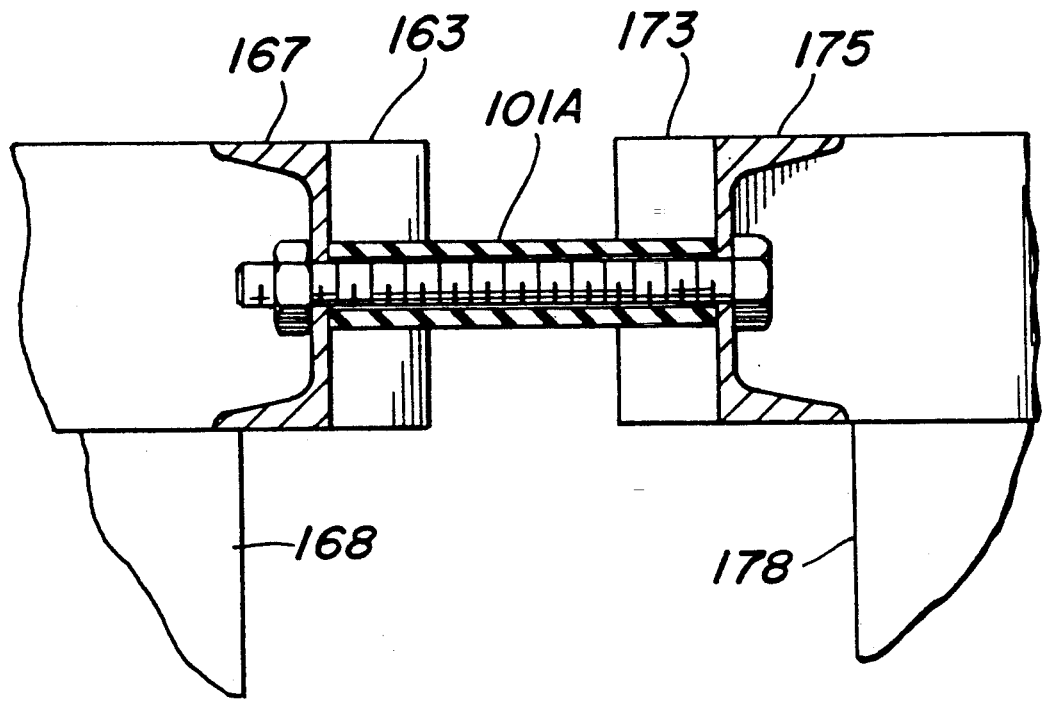
FIG. 19 is a detail view of the connection between the double carts.

A feature of the double cart assembly 101 is that it comprises two individual carts 160 and 170 which are connected together in a manner such that each cart 160, 170 is capable of supporting an individual pallet load independently of the other cart. This independent connection permits each cart 160 and 170 to be installed individually in the track system and interconnected while positioned in their installed condition. To this end, there is provided a plurality of connections 101A, each of which extends between adjacent brackets 169 and 178 of carts 160 and 170, respectively. Each connection 101A comprises, as shown in FIG. 19, a nut and bolt arrangement extending between and interconnecting the webs of channels 167 and 175, and a tubular sleeve made of resilient material, such as a rubber composition, and mounted on the shaft portion of the bolt extending between the channel webs. The resilient sleeve acts as a shock absorber between the carts 160 and 170 during the use thereof.

Figure 22:
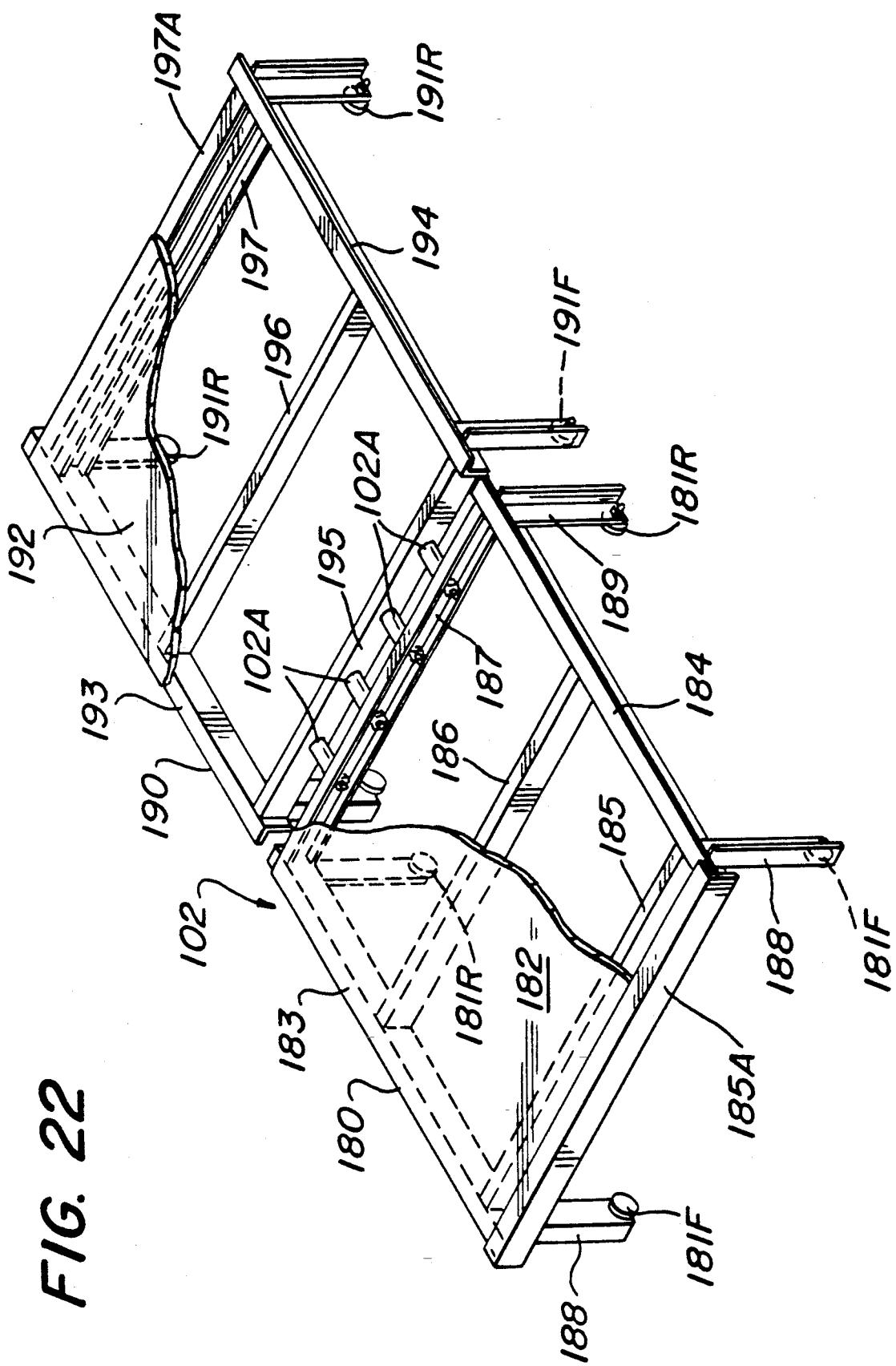

The upper second cart assembly 102 is shown in FIG. 22 and comprises interconnected carts 180 and 190. Cart 180, which may be termed the forward cart of the second cart assembly 102, includes a rectangular frame formed of a plurality of structural members welded together and best shown in FIG. 22. The frame of cart 180 comprises a pair of side structural angles 183 and 184, a front structural channel 185, a middle structural channel 186 and a rear structural channel 187. Side angles 183 and 184 are welded at their front ends to a front angle 185A at the ends thereof. Members 185, 186, and 187 extend between and are welded at their ends to side angles 183 and 184. A pair of angle brackets 188 are welded to the front end of cart 180 in an arrangement to provide a downwardly extending leg portion at each end for supporting the inwardly facing front wheel assemblies 181F of cart 180. Also, a pair of angle brackets 189 are welded to the rear end of cart 180 to provide downwardly extending legs for supporting inwardly facing rear wheel assemblies 181R. Thus, there are provided two bearing-type wheel assemblies mounted on each side of the cart frame at the front and rear ends thereof to provide four rolling supports for cart 180, the front wheel assembly on each side being indicated at 181F and the rear wheel assembly on each side being indicated at 181R. The front and rear wheel assemblies 181F and 181R ride on the outwardly facing tapered bottom flange portions of the I-shaped structural member forming third tracks 123. A rectangular support plate 182 is mounted on top of frame members 183–187. The frame for cart 180 is of a size so as to support a pallet load, as indicated by the pallet load F in the arrangement shown in FIG. 17B.

The cart 190, which may be termed the rearward cart of the second cart assembly 102, is manufactured as an independent unit and includes a rectangular frame for providing support for a loaded pallet, a plurality of wheel assemblies 191F and 191R on each side of the cart frame, and means for supporting each of the wheel assemblies 191F, 191R to make rolling contact with the third tracks 123 of the track means as cart 190 moves along the depth of the storage bay between a forward and a back position. Cart 190 includes a rectangular frame formed of five structural members welded together as best shown in FIG. 22. Cart 190 comprises a pair of side angles 193 and 194, a front channel 195, a middle channel 196 and a rear channel 197. Channel members 195, 196, and 197 and a rearmost angle 197A are welded at their ends to side angles 193 and 194 in an arrangement best shown in FIG. 22. The pairs of inwardly facing bearing-type wheel assemblies 191F and 191R are mounted on pairs of supports 198 and 199, respectively, welded to the frame at the front and rear ends of cart 190, to thereby provide four rolling supports for the cart 190. The front and rear wheel assemblies 191F and 191R ride on the outwardly facing lower flange portions of the I-shaped structural members forming the pair of third tracks 123. A rectangular support plate 192 is mounted on top of frame members 193–197. The frame for cart 190 is of a size so as to be able to support a pallet load as indicated by the pallet load G in the arrangement shown in FIG. 17B.

A feature of the double cart assembly 102 is that, like cart assembly 101, it comprises two individual carts 180 and 190 which are connected together in a manner such that each cart 180 and 190 is capable of supporting an individual pallet load independently of the other cart. This independent connection of the carts 180 and 190 permits each cart to be installed individually in the track system and interconnected while positioned in their installed condition. To this end, the brackets 189 and 198 of carts 180 and 190, respectively, are interconnected by a plurality of connections 102A which have the same construction as connections 101A shown in detail in FIG. 19. The nut and bolt arrangement and resilient sleeve of each connection 102A act as a shock absorber between the carts 180 and 190.

The wheel assemblies for the carts 140, 160, 170, 180 and 190 are of the same general construction and are mounted on vertically extending leg portions of said carts by conventional means and in a manner as described in detail in said prior mentioned patents.

The carts 140–190 are each mounted into the tracks on which they ride by the use of cut-outs formed in the upper flanges of the structural members forming said tracks, said insulation procedure being conventional in the art and being described in detail in my prior application Ser. No. 709,664. Briefly, the cut-outs are located to correspond to the spacing of the wheel assemblies of the associated carts and actual field insertion is achieved by a procedure whereby the cart is tilted at an angle and the left side wheels are slipped into the left hand tracks and the cart is maneuvered so that the right side cart wheels can then be dropped through the track cut-outs into the installed position on the tracks.

As discussed above, cart 140 is arranged so that its front and rear wheel assemblies 141F and 141R ride on the tracks 121 as cart 140 moves between a forward position at the entry end of the storage bay and a back position three pallets deep from the entry end of the storage bay. Cart assembly 101, which comprises carts 160 and 170, is arranged so that all of its wheel assemblies 161F, 161R, 171F, 171R are positioned to ride on the tracks 122 as cart assembly 101 moves between a forward position at the entry end of the storage bay and a back position spanning four and five pallets deep from the entry end of the storage bay. Cart assembly 102, which comprises carts 180 and 190 is arranged so that all of its wheel assemblies 181F, 181R, 191F, 191R ride on third tracks 123 as cart assembly 102 moves from a forward position at the entry end of the storage bay and a back position spanning six and seven pallets deep from the entry end of the storage bay.

The carts 140, 160, 170, 180, and 190 are constructed and arranged so that the forward position of cart 160 overlies the forward position of cart 140 at the one pallet deep position, the forward position of cart 180 overlies the forward positions of carts 140 and 160, and the forward position of cart 190 overlies the forward position of cart 170 at the two pallet deep position.

As is described in said prior patents there are provided suitable bumper means for holding the cart 140 and cart assemblies 101 and 102 in their forward position at the entry end of the storage bay. These bumper means cooperate with the front angles 145A, 165A, and 185A of cart 140, cart assembly 101 and cart assembly 102, respectively.

The pairs of tracks 121, 122, and 123 are all mounted on the shelf beams of the framework so that they extend at a slight inclination toward the entry end of the storage bay. As is described in detail in said prior patents, the inclination is achieved by the accurate locating of the position of the supporting structure for the track means and is typically about 5/16 inch for each twelve inches of length.

Carts 140, 150, 160, 170, 180 and 190 are constructed so that the pallet supporting top surface of each cart is maintained in a level (ie., horizontal) position on the inclined track means for said carts. This type of cart construction is described in detail in said U.S. Pat. No. 4,955,489 with respect to FIGS. 18–19 thereof. Briefly, this is achieved by making the front wheel assemblies of a larger vertical extent than the rear wheel assemblies for each cart. In other words, the support means for the front wheel assemblies are constructed and arranged so that the front end of the top surface of the cart is spaced from the place of rolling contact with the track an amount greater than that of the rear end thereof so that said top supporting surface is maintained in a horizontal plane while a cart supported on the inclined tracks 121, 122, and 123 rides therealong. Thus, the supporting surface of the cart remains level even though the cart moves along an inclination as it moves between its forward and back positions on the inclined tracks supporting the same.

Figure 17A:
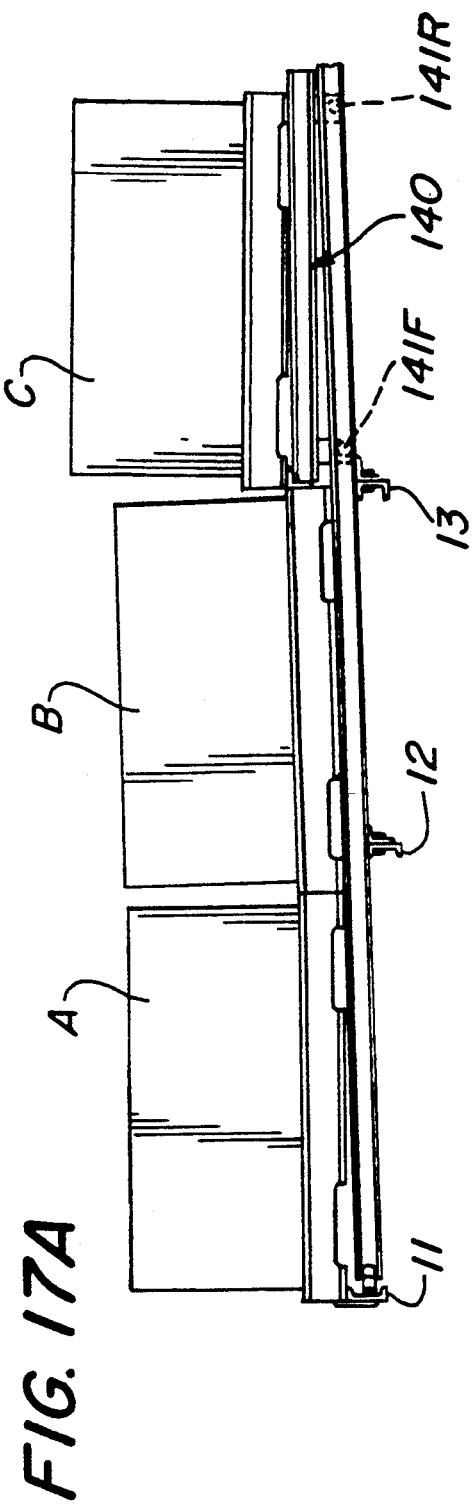
FIGS. 17A and 17B are side elevational views of the second embodiment of the invention.
Figure 17B:
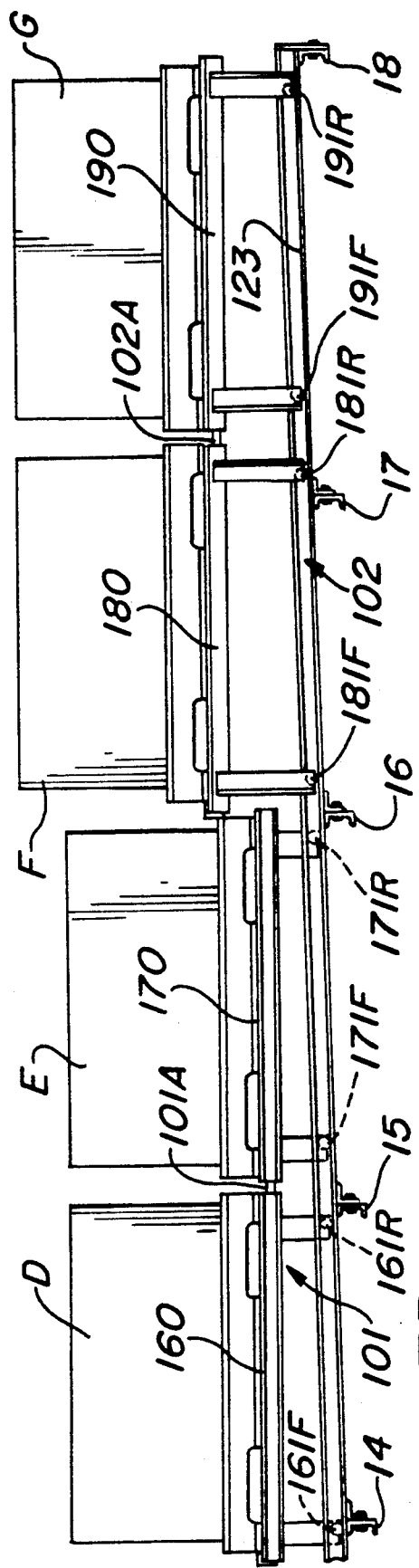

As is apparent from a consideration of the drawings, the forward position of carts 140, 160, 170, 180 and 190 are located at the entry end of the storage bay, the back position of cart 140 being three pallets deep from the entry end of the storage bay, the back position of cart 160 being four pallets deep from the entry end of the storage bay, the back position of cart 170 being five pallets deep from the entry end of the storage bay, the back position of cart 180 being six pallets deep from the entry end of the storage bay, and the back position of cart 190 being seven pallets deep from the entry end of the storage bay. Thus, each row of the storage bay can store seven pallet loads A, B, C, D, E, F and G in an arrangement as best shown in FIGS. 17A, 17B. The front pallet supported load A is supported on the track means on the structural members forming tracks 121, 122 and 123, the pallet load B is supported on tracks 121, 122, and 123 adjacent load A, the pallet load C is supported on the cart 140, the pallet load D is supported on the cart 160, the pallet load E is supported on the cart 170, the pallet load F is supported on cart 180 and the pallet load G is supported on the cart 190.

The pallet loads A, B, C, D, E, F and G will be placed in the position shown in FIGS. 17A, 17B by a conventional pushback loading technique employing conventional "deep-reach" forklift trucks, which technique is well known in the art. Thus, the first pallet load G to be stored will be placed on the empty rearward cart 190 of cart assembly 102 positioned two pallets deep at the entry end of the storage bay by means of a deep reach forklift truck. When it is desired to store the second pallet load F in the storage bay, the fork truck places the load F onto the empty forward cart 180 of cart assembly 102 positioned at the entry end of the storage bay. When it is desired to store a third pallet load E, the fork truck with the third load E approaches the storage rack and the pallet load E gently nudges the first two loads F and G toward the rear whereby the loads F and G, and the carts 180 and 190 of cart assembly 102 supporting the same, are pushed back rearwardly toward the rear of the storage rack up to the point where the fork truck can place the load E on the empty rearward cart 170 of cart assembly 101 two pallets deep at the entry end of the storage bay. When the fourth load D is to be stored, the fork truck with the pallet load D thereon is maneuvered to deposit the fourth load D on the empty forward cart 160 of cart assembly 101 positioned at the entry end of the storage bay. When the fifth pallet load C is to be stored, the fork truck with the pallet load C thereon gently nudges the other pallet loads D, E, F and G supported on carts 160, 170, 180 and 190, respectively, toward the rear of the storage rack until the fork truck can deposit the fifth load C on the empty cart 140. When the sixth pallet load B is to be stored, the fork truck with the pallet load B thereon gently nudges the other pallet loads C, D, E, F and G supported on carts 140, 160, 170, 180 and 190, respectively, toward the rear of the storage rack until the fork truck can deposit the sixth load B on the tracks 121, 122, and 123 at a position to pallets deep from the entry end of the storage bay. When the seventh pallet load A is to be stored, the fork truck with the pallet load A thereon is maneuvered to deposit the seventh load A on the structural members providing tracks 122 and 123 and the front shelf beam 11 at the forward loading position at the entry end of the storage bay. In this manner the row of the storage rack is full loaded with seven pallet loads. In order to unload the seven pallet loads, a procedure which is essentially the reverse of the above-described procedure is employed.

What is claimed is:

1. In a storage rack for supporting pallet loads at least seven pallets deep having a framework providing a plurality of storage bays which is defined by a plurality of vertical uprights and horizontal shelf beams, each of said storage bays comprising:

a plurality of carts, track means extending along the depth of said storage bay at the same level for supporting said cart means for movement along said tracks from forward positions to back positions thereof, said plurality of carts including:

a first cart whose back position is located three pallets deep from the entry end of the storage bay, a second cart whose back position is located four pallets deep from the entry end of the storage bay, a third cart whose back position is located five pallets deep from the entry end of the storage bay, a fourth cart whose back position is located six pallets deep from the entry end of the storage bay, and a fifth cart whose back position is located seven pallets deep from the entry end of the storage bay, said tracks of said track means each being mounted on the storage bay framework so as to be on the same level and to be inclined forwardly toward the entry end of the storage bay, whereby said cart are supported so that they tend to roll along said track means toward the entry end of the storage bay.

2. A storage rack according to claim 1 wherein at least two of said carts have a forward position located at the entry end of the storage bay.

3. A storage rack according to claim 1 wherein the forward position of all of said carts is located at the entry end of the storage bay.

4. A storage rack according to claim 1 wherein said second and third carts are interconnected by a resilient connection to form a cart assembly constructed and arranged so that said second and third carts move together along said track means, the forward position of said second cart being at the entry end of the storage bay and the forward position of said third cart being two pallets deep from the entry end of the storage bay.

5. A storage rack according to claim 4 wherein said fourth and fifth carts are interconnected by a resilient connection to form a cart assembly constructed and arranged so that said fourth and fifth carts move together along said track means, the forward position of said fourth cart being located at the entry end of the storage bay and the forward position of said fifth cart being located two pallets deep from the entry end of storage bay.

6. A storage rack according to claim 1 wherein said plurality of carts includes a sixth cart supported for movement along said track means from a forward position at the entry end of the storage bay to a back position two pallets deep from the entry end of the storage bay in said back position thereof.

7. A storage rack according to claim 6 wherein said track means comprises:
   a first pair of parallel rails each having inwardly and outwardly facing cart supporting tracks extending over a distance including only part of the depth of the storage bay and being spaced apart across the width of the storage bay, and
   a second pair of parallel rails having inwardly and outwardly facing cart supporting tracks extending from the front to the back along the depth of the storage bay and being spaced apart across the width of the storage bay,
   said first pair of rails being located inwardly of said second pair of rails.

8. A storage rack according to claim 7 wherein each of said carts includes a frame providing support for a pallet load and front and rear wheel assemblies on each side of said cart frame arranged to make rolling contact with one of said tracks as the cart moves along the depth of the storage bay between a forward position and a back position,
   said front and rear wheel assemblies of said sixth cart being arranged to ride on said inwardly facing tracks of said first pair of rails as said sixth cart moves from a forward position to a back position two pallets deep
   said front wheel assemblies of said first cart being arranged to ride on the outwardly facing tracks of said first pair of rails and said rear wheel assemblies of said first cart being arranged to ride on said inwardly facing tracks of said first pair of rails as said first cart moves from a forward position to a back position three pallets deep from the entry end of the storage bay.
   said front and rear wheel assemblies of said second cart being arranged to ride on the outwardly facing tracks of said first pair of rails as said second cart moves from a forward position to a back position four pallets deep from the entry end of the storage bay.

9. A storage rack according to claim 8 wherein said front and rear wheel assemblies of said third cart are arranged to ride on said inwardly facing tracks of said second pair of rails as said third cart moves from a forward position to back position five pallets deep,
   said front wheel assembly of said fourth cart being arranged to ride on said outwardly facing tracks of said second pair of rails and said rear wheel assemblies of said fifth cart or fourth cart being adapted to ride on said inwardly facing tracks of said second pair of rails as said fourth cart moves from a forward position to a back position six pallets deep, and
   said front and rear wheel assemblies of said fifth cart being arranged to ride on said outwardly facing tracks of said second pair of rails as said fifth cart moves from a forward position to a back position seven pallets deep.

10. In a storage rack for supporting pallet loads at least seven pallets deep having a framework providing a plurality of storage bays each of which is defined by a plurality of vertical uprights and horizontal shelf beams, each of said storage bays comprising:
    a plurality of carts,
    track means extending along the depth of said storage bay for supporting said cart means for movement along said track means from forward positions to back positions, said track means comprising:
    at least two pairs of parallel tracks having cart supporting portions extending along the depth of the storage bay and being spaced apart across the width of the storage bay,
    said plurality of cart means including:
    a first cart whose back position is located three pallets deep from the entry end of the storage bay,
    a second cart whose back position is located four pallets deep from the entry end of the storage bay,
    a third cart whose back position is located five pallets deep from the entry end of the storage bay,
    a fourth cart whose back position is located six pallets deep from the entry end of the storage bay, and
    a fifth cart whose back position is located seven pallets deep from the entry end of the storage bay, said second and third carts being interconnected to form a cart assembly constructed and arranged so that said second and third carts move together along said track means, said forward position of said second cart being one pallet deep at the entry end of the storage bay and the forward position of said third cart being two pallets deep from the entry end of the storage bay, and
    resilient means interconnecting said second and third carts to act as a shock absorber therebetween,
    said tracks of said track means each being mounted on the storage bay framework so as to be inclined forwardly toward the entry end of the storage bay, whereby said cart means are supported so that they tend to move along said track means toward the entry end of the storage bay.

11. A storage rack according to claim 10 wherein said fourth and fifth carts are interconnected to form a cart assembly constructed and arranged so that said fourth and fifth carts move together along said track means, the forward position of said fourth cart being located at the entry end of the storage bay and the forward position of said fifth cart being located two pallets deep from the entry end of storage bay.

12. A storage rack according to claim 11 including resilient means interconnecting said fourth and fifth carts to act as a shock absorber therebetween.

13. In a storage rack for supporting pallet loads multiple pallets deep having a framework providing a plurality of storage bays each of which is defined by a plurality of vertical uprights and horizontal shelf beams, each of said storage bays comprising:
    a plurality of carts,
    track means extending along the depth of said storage bay for supporting said carts for movement along said tracks from forward positions to back positions thereof, said track means comprising:
    a first pair of parallel rails each having inwardly facing cart supporting tracks extending over a distance including only part of the depth of the storage bay and being spaced apart across the width of the storage bay,
    a second pair of parallel rails having inwardly and outwardly facing cart supporting tracks extending from front to back along the depth of said storage bay and being spaced apart across the width of the storage bay,
    said first pair of rails being located inwardly of said second pair of rails,
    said plurality of carts including:

a first cart including a frame providing support for a pallet load, front and rear wheel assemblies on each side of said first cart arranged to make rolling contact with one of said tracks as said first cart moves along the depth of the storage bay between a forward position and a back position, and a first cart assembly including a second cart and third cart each of which includes a frame providing support for a loaded pallet, front and rear wheel assemblies on each side of said second and third cart arranged to make rolling contact with one of said tracks as said second and third carts move along the depth of the storage bay between a forward and a back position, and means including a resilient shock absorber for interconnecting said second and third carts for conjoint movement along said track means, the front and rear wheel assemblies of said first cart being constructed and arranged to make rolling contact with said inwardly facing tracks of said first rails, the front and rear wheel assemblies of said second and third carts being adapted to make rolling contact with said inwardly facing tracks of said second rails, said track means being mounted on the storage bay framework so as to be inclined toward the entry end of said storage bay, whereby said carts are supported so that they tend to roll along said track means toward the entry end of said storage bay.

14. A storage rack according to claim 13 wherein the forward position of said first cart is located at the entry end of the storage bay, the forward position of said second cart overlying the forward position of said first cart, and the forward position of said third cart being located two pallets deep from the entry end of the storage bay, the cart supporting positions of said first tracks being located in the region of one to three pallets deep from the entry end of the storage bay.

15. A storage rack according to claim 13 for storing pallet loads of at least six pallets deep wherein said track means includes a second cart assembly including a fourth cart and a fifth cart each of which includes a frame providing support for a pallet load, front and rear wheel assemblies on each side of said fourth and fifth cart wheel assemblies to make rolling contact with said outwardly facing tracks of said second pair of rails as said fourth and fifth carts move along the depth of the storage bay between a forward and a back position, and means including a resilient shock absorber for interconnecting said fourth and fifth carts for conjoint movement along said track means.

16. A storage rack according to claim 15 wherein the forward position of said fourth cart overlies the forward position of said second cart at the entry end of the storage bay, and the forward position of said fifth cart overlies the forward position of said third cart two pallets deep from entry end of the storage bay.

17. A storage rack according to claim 16 for storing pallet loads of at least seven pallets deep, wherein the cart supporting positions of said first tracks are located in the region of two and three pallets deep from the entry end of the storage bay, the back position of said first cart being located three pallets deep from the entry end of the storage bay, the back position of said first cart assembly being such that the second cart is located four pallets deep from the entry end of the storage bay and said third cart is located five pallets deep front the entry end of the storage bay, and the back position of said second cart assembly is located such that said fourth cart is located six pallets deep from the entry end of the storage bay and said fifth cart is located seven pallets deep from the entry end of the storage bay.

* * * * *